(12) United States Patent
Cook et al.

(10) Patent No.: US 6,213,174 B1
(45) Date of Patent: Apr. 10, 2001

(54) PORTIONING OF FLOWABLE PRODUCTS

(75) Inventors: Bernard Brian Cook; John McEwan, both of Hamilton; Lim Peng Keong; Werner Eugen Friedrich, both of Auckland, all of (NZ)

(73) Assignee: Blue Boy International Limited, Hamilton (NZ)

( * ) Notice: Subject to any disclaimer, the term of this patent is extended or adjusted under 35 U.S.C. 154(b) by 0 days.

(21) Appl. No.: 09/248,954

(22) Filed: Feb. 12, 1999

(51) Int. Cl.$^7$ .................................................. B65B 1/30
(52) U.S. Cl. ................................. 141/83; 141/1; 141/174
(58) Field of Search ............................. 141/83, 173, 174, 141/175, 1, 128, 192, 198; 177/122; 222/641, 129.1, 146.6

(56) References Cited

U.S. PATENT DOCUMENTS

| | | | |
|---|---|---|---|
| 3,236,270 | * 2/1966 | Stutz | 141/174 |
| 3,638,392 | * 2/1972 | Welker, Jr. et al. | 141/174 |
| 4,648,430 | * 3/1987 | Di Gianfilippo et al. | 141/1 |
| 5,148,841 | * 9/1992 | Graffin | 141/83 |
| 5,287,896 | 2/1994 | Graffin | 141/83 |
| 5,402,834 | 4/1995 | Levin et al. | 141/83 |
| 5,515,888 | 5/1996 | Graffin | 141/83 |
| 5,957,040 | * 9/1999 | Feola | 99/450.6 |

* cited by examiner

Primary Examiner—Steven O. Douglas
Assistant Examiner—Khoa D. Huynh
(74) Attorney, Agent, or Firm—James A. Quinton, Esq.

(57) ABSTRACT

This invention is directed to methods, procedures and apparatus for controlling the portioning of flowable materials, particularly soft serve frozen confections, though also including other flowable products. Such other products may include soups, beverages such as milk shakes, soft drinks, and alcoholic beverages such as beers, and so forth.

Typically a method for controlling the delivery of a portion of a flowable substance includes the steps of:
 i) Delivering the flowable substance in a stream; and
 ii) Noting the time for the delivery of a portion of a targeted amount; and
 iii) Determining the weight of the portion, and
 iv) Using this information to influence the delivery of further substance to meet a pre-determined target value.

A preferred method is characterized by both the weight of the flowable substance being delivered and the time for the delivery of same being repeatedly or continuously assessed to achieve delivery of a pre-determined target weight or volume.

13 Claims, 7 Drawing Sheets

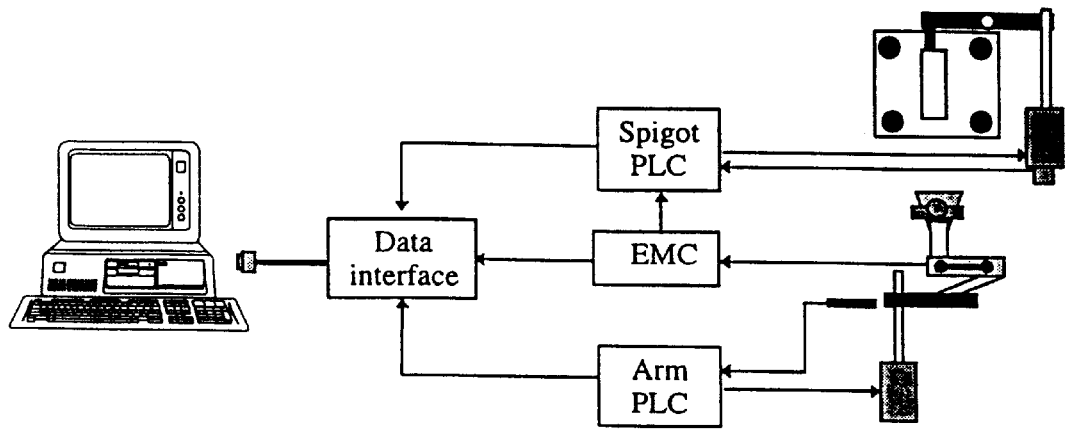
Figure 4 Block Diagram of Operation
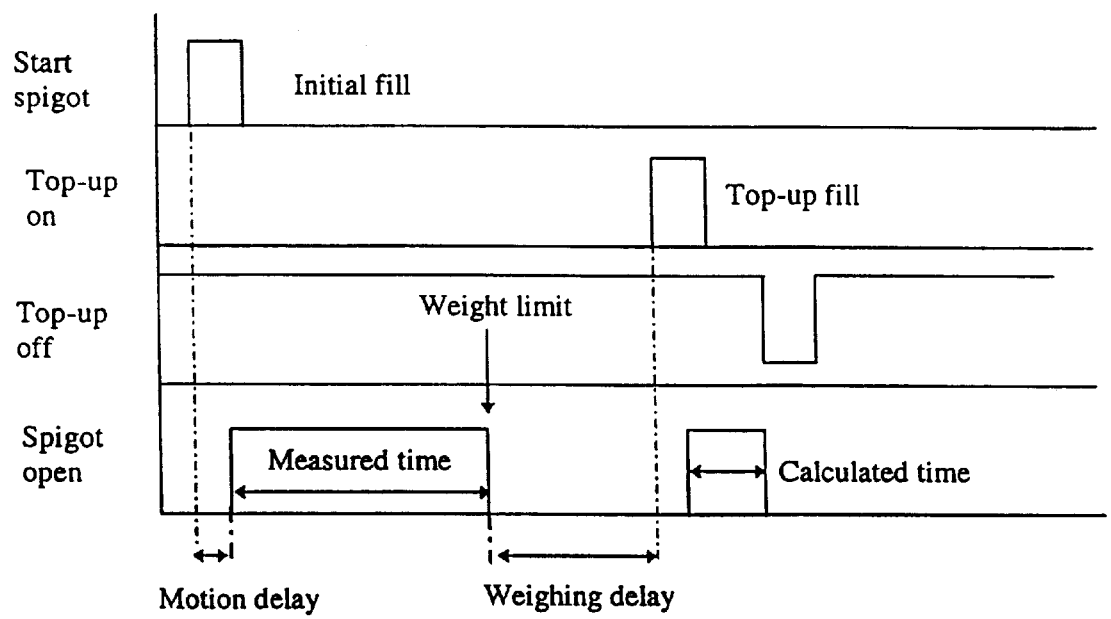
Figure 6 Spigot timing signals

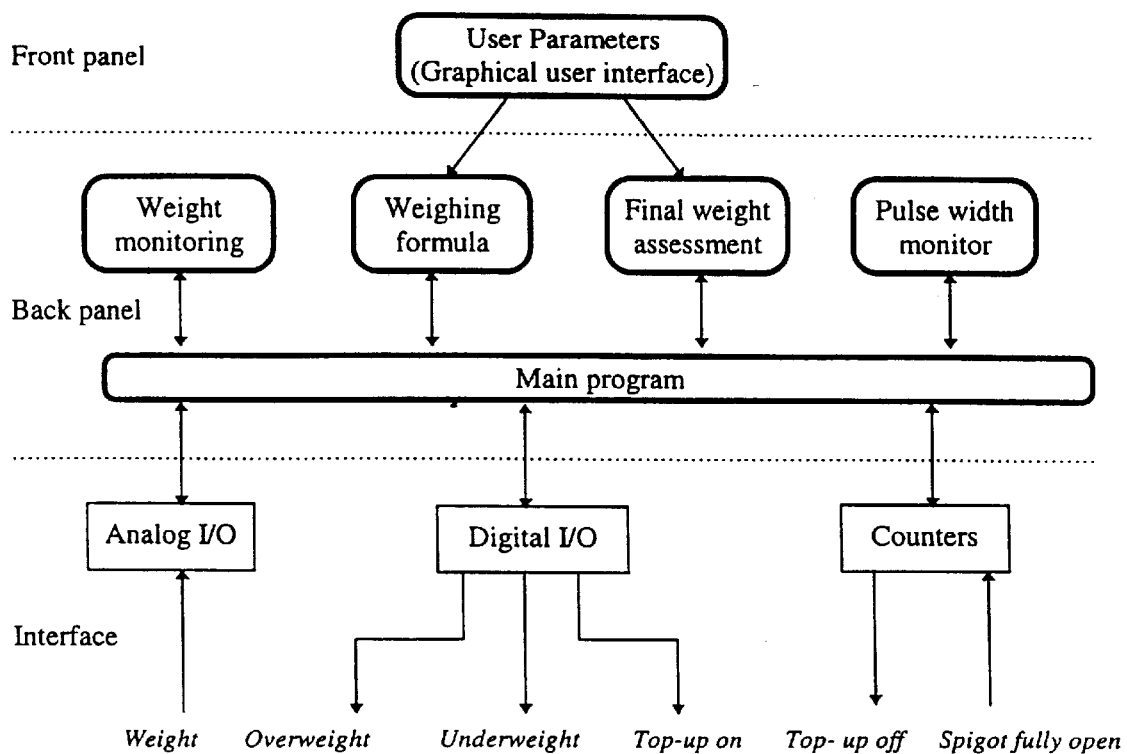
Figure 5 Program structure for LabView

Weight Variation
(± 5% tolerance band shown)

Weight profile of a typical soft serve draw

PORTIONING OF FLOWABLE PRODUCTS

TECHNICAL FIELD

This invention relates to improvements in and relating to the portioning of flowable products.

In particular, the invention is directed to methods, procedures and apparatus for controlling the portioning of flowable materials.

It is envisaged the invention will have greatest application in the methods and procedures for the portioning of soft serve frozen confections. However, it is envisaged the present invention will have a wide range of applications relating to the portioning of other flowable products. Such other products may include soups, beverages such as milk shakes, soft drinks and alcoholic beverages such as beers, and so forth.

BACKGROUND ART

Apparatus exists in the prior art for accurately portioning soft drinks and thick (milk) shakes. However, apparatus for controlling delivery of portions of flowable substances (particularly non-liquid substances) that regularly change their physical characteristics due to ingredient composition, processing procedures during manufacture, environmental conditions, draw-off rate, and the manner in which a product is frozen for example, is generally unavailable. Accordingly, the present invention was developed with the problems associated with the portioning of soft serve frozen confections in mind. In particular, the automated delivery of frozen confections is difficult to control.

However, the problems and difficulties associated with this particular type of product are also encountered in the portioning of other flowable products. Such problems arise as a result of the properties of the flowable product itself, as well as external conditions affecting the product. Accordingly, it is envisaged that the present invention will have a wide range of applications.

Many other flowable materials, in particular granulated dry materials, have consistent flow characteristics enabling them to be portioned into different lots quite readily. Where the flowable product is a granulated dry product, the flow characteristics will be dependent upon the size of the granules.

A typical method of portioning such goods is by time—the goods are delivered for a period of time known to correspond with a particular weight. Consistent and accurately sized portions are achievable this way for many of these types of goods having consistent flow characteristics.

Where the flowable product is a mixture comprising a liquid component and a dried component, the flow characteristics will be dependent upon the proportion of liquid to dry product in the mixture, the amount of air in the mixture (dependent on the means by which the flowable product has been mixed), and so forth.

External factors will also affect the flow characteristics of the flowable product. Such external factors include the ambient temperature in the area where the product is stored, as well as the temperature in the vicinity of delivery of the flowable product. The relevant temperature of both of these is particularly relevant for frozen confections.

Where the factors of temperature, particle size, liquid content, and so forth can be controlled to an optimal level the portioning of such goods is typically achieved on the basis of a portion size. Obtaining a portion of a particular size and weight is typically determined by the delivery time for delivery of the product into a receptacle. Automated delivery of a range of products uses this premise.

The desire to obtain consistent and accurately sized portions is however desirable. Consistency and accuracy of portions may be more easily achieved with types of goods having consistent flow characteristics.

Delivery of frozen confections is one area where automation of delivery is advantageous. However, the automated delivery of frozen confections has its own inherent difficulties.

Varying perimeters, including but not limited to the viscosity of the mixture (which in turn can be affected by the air content of the mixture, the constitution of the mixture, temperature, the viscosity setting of the machine required to deliver the frozen confection, and air pressure), all contribute to differences in the physical characteristics of a single product over time. Therefore, consistent and accurately sized portions automatically delivered has been difficult to achieve.

The type of mixing apparatus used for mixing the liquid component and dry component of the frozen confection together and the type of machine used for the delivery of such frozen confections introduces yet further complications in obtaining overall consistency in the portioning of a particular frozen confection.

Where the frozen confections being delivered is a soft serve ice cream, the varying perimeters discussed above can (when using a time-based, automatic method of pouring the product) frequently result in inconsistent pours.

The problems encountered due to differences in viscosity, density and other physical characteristics within a single product are also further exacerbated where different products are delivered using the same machine via the same or different outlet nozzle.

Accordingly, any system for portioning the delivery of such products needs to be able to take account of the different product characteristics, the effect of environmental and mechanical variables and the amount of product required to be delivered.

Further, many machines (for delivering portions of frozen confections) used in a variety of food outlets, or delivery vans may be operated by a number of individuals, each with different levels of expertise in assessing the appropriate portioning of the flowable product. Individuals with lesser experience demonstrate inconsistent portioning, whilst even those with a significant degree of expertise may be unable to replicate consistent delivery of a flowable product of the required amount.

A typical problem using this method of delivery is that the particular serve or portion is typically overweight to ensure that on average the weight does not fall below a minimum weight for the package, so as to avoid the risk of violating consumer laws. This becomes a cost to the business in both wastage of product and staff time. On the other hand, attempts to minimise the wastage arising from overweight portioning may result in underweight portions. This is a significant problem where consumer laws require the weight of a product in a container equate to the labeled or specified weight.

There may be no legal requirement relating to the portion size or weight of soft serve ice cream delivered into a cone or cup at the point of sale whilst the customer waits. However, it is still desirable to improve the continuity of delivery of a preferred portion size and weight for reasons of economy to the vendor, and satisfaction of the customer.

The consequence therefore for a number of industries is that it is very difficult to accurately portion certain types of flowable materials, and the result is that many containers are over filled by a significant margin. Examples of goods for which consistent size/weight portioning may be often difficult to achieve or maintain include pre-packed containers of desserts, mayonnaises, mashed or puréed vegetables, and so forth. Accordingly, automated machinery for more accurately delivering these types of products to achieve a consistent portion would be preferable.

While current methods for determining consistency of delivery include monitoring the flow rate of the product during the portioning process, a system that can accurately and consistently delivery portions (particularly of small amounts of frozen confection for direct consumption by an individual) via an automated machine is not available.

However, there are a number of other considerations inherent to and associated with frozen confections. For instance, the consistency and viscosity of the product may vary significantly. Not only may different types of frozen confections have different densities, viscosities and other physical characteristics, but even a single product may vary in its physical characteristics over time. Both of these two types of situations introduce complications in the preparation of automated control machinery for delivering these types of products.

Considering even a single type of product, such as a soft serve ice cream to be portioned into cones, there is a noticeable difference in viscosity of the product over time. Many modern ice cream churns in use for delivering soft serve confections to the public do include a viscosity regulating system. Nevertheless, there are still observable variations in viscosity after start up and until the unit equilibrates at the preferred viscosity and even then there is typically still some observable fluctuation in viscosity. For instance, if the machine has remained idle over a prolonged period (such as due to reduced demand) then once again the viscosity may not be within the preferred range when the next lot or portion is drawn off. This causes a problem as different viscosities mean different flow rates. Accordingly, any method of control based on time alone, will give inconsistent and inaccurate results.

The other general type of situation is where the same machinery is used for different products during the same or different periods of time. This introduces a complication as the desired viscosity and physical characteristics of different products may differ from one another. Accordingly, using a portioning system based purely on time means the device would need to be re-calibrated every time a different type of product having different characteristics was to be used. Again this introduces complications in both setting up the apparatus for the user, and also for accurately portioning the product should the calibration procedures not be accurately performed, or overlooked. It can also prevent a single portioning system from being able to draw from more than one source.

A partial solution to this problem would be to monitor the flow rate of the product issuing during the portioning process. For example, standard metering equipment capable of measuring flow can be used to determine the weight of a portion given information regarding the nature (characteristics) of the product and the flow rate of it. However, a device suitable for use with products such as frozen confection may be expensive and/or may not easily be accommodated within the dispensing channel associated with frozen confection items.

The consequence of these difficulties is that there is not, to the knowledge of the applicants, any automated machinery available for accurately and consistently delivering portions of frozen confection substances, or other substances having similar types of associated problems. This is despite a significant need for such a device. For instance, fast food chains still dispense items such as ice cream sundaes, and ice creams in cones, manually.

The result is a large inconsistency in weight and volume of the delivered product, depending upon the skill and attention of the operator. The high through-put of fast food outlets often means that the attendant must leave the machine running to fill a container while they attend to other matters. However they must still monitor the filling process, and quite often the resulting container may be under-filled, though more commonly over-filled. It may also mean that the attendant will need to stand near the machine and monitor the final filling of the container or vessel.

It is an object of the present invention to address the foregoing problems or at least to provide the public with a useful choice.

Further aspects and advantages of the present invention will become apparent from the ensuing description, given by way of example only.

DISCLOSURE OF INVENTION

According to one aspect of the present invention there is provided a method for controlling the delivery of a portion of a flowable substance comprising the steps of:

i) Delivering the flowable substance in a steam; and ii) Noting the time for the delivery of same; and iii) Determining the weight of the flowable substance as it is delivered to meet a pre-determined target value and the method characterised by both the weight of the flowable substance being delivered and the time for the delivery of same being continuously assessed to achieve a pre-determined target value of the portion of flowable substance required.

According to another aspect of the present invention there is provided a method for controlling the delivery of a portion of a flowable substance wherein a series of reiterative approximations are repeated to achieve delivery of the flowable substance until the pre-determined target value is obtained.

Accordingly to another aspect of the present invention there is provided a method for controlling the delivery of a portion of a flowable substance wherein the reiterative approximations are determined by continually dynamically weighing the portion during delivery, and terminating the delivery when a pre-determined value is reached.

According to another aspect of the present invention there is provided a method for controlling the delivery of a portion of a flowable substance wherein the series of reiterative approximations resulting in a delivery is determined from analysis of recently and/or previously collected time and weight data.

According to another aspect of the present invention there is provided a method for controlling the delivery of a portion of a flowable substance wherein the series of reiterative approximations are repeated to achieve a substantially continuous delivery of the flowable substance until the pre-determined target value is obtained.

According to another aspect of the present invention there is provided a method for controlling the delivery of a portion of a flowable substance wherein the series of reiterative approximations are repeated to achieve delivery of the flowable substance in a series of discrete steps until the pre-determined target value is obtained.

According to another aspect of the present invention there is provided a method for controlling the delivery of a portion of a flowable substance comprising the steps of:
i) delivering an approximate first lot of said substance, and noting the time for the delivery of same;
ii) determining the weight of said first lot which has been delivered;
iii) determining the remaining weight of substance still required to meet a pre-determined target value;
iv) determining the top-up time, based on the determined weight and time data, to deliver the remaining weight of substance to achieve the target value;
v) delivering a further lot of substance for the determined top-up time.

According to another aspect of the present invention there is provided a method for controlling the delivery of a portion of a flowable substance wherein, in step 1, the delivered amount of the first lot is determined by dynamically weighing the portion during delivery, and terminating delivery when a pre-determined value is reached.

According to another aspect of the present invention there is provided a method for controlling the delivery of a portion of a flowable substance wherein, in step 1, the delivered amount is determined from analysis of recently and/or previously collected time and weight data, to determine a best time interval for delivery of the first lot.

According to another aspect of the present invention there is provided a method for controlling the delivery of a portion of a flowable substance in which the weight of the first lot is in excess of 60%, and preferably in excess of 75%, of the final target value.

According to another aspect of the present invention there is provided a method for controlling delivery of a portion of a flowable substance in which the preferred amount of the first lot is less than the final target value by an amount exceeding the minimum amount that any controlled apparatus can deliver in a single delivery operation.

According to another aspect of the present invention there is provided a method for effecting the delivery of a predetermined target amount of a flowable substance, said method including steps of:
i) initiating delivery of said substance;
ii) part way during the delivery of said substance, determining the delivery weight and corresponding time for delivery of a portion of the predetermined target amount;
iii) determining the remaining weight of substance required to meet the predetermined target amount;
iv) calculating the top-up time based on determined weight and time data for completing delivery of the predetermined target amount;
iv) the further delivery of said substance based on top-up time calculations until said target is met, and
v) where optionally steps (ii) through (v) are repeated as a series of two or more successive reiterations until the targeted amount is delivered.

According to another aspect of the present invention there is provided a method for controlling the delivery of a portion of a flowable substance in which, before an accurate determination of weight is made in step 2, any residual substance bridging from a delivery spigot to the delivered substance, may be broken.

According to another aspect of the present invention there is provided a method of controlling the delivery of a portion of a flowable substance substantially as described above wherein when implemented into automated dispensing apparatus for flowable comestible materials, and in particular beverages and frozen confections, said automated dispensing apparatus includes a portion control apparatus in turn comprising:

a spigot issuing delivered material to a suitable receptacle at a preferred delivery rate the receptacle maintained in position by a receptacle holder which after delivery of a target amount of delivered material allows removal of said receptacle, there also being included a timer and weight measurement apparatus for determining the weight of the receptacle and its contents, there being in the automated dispensing apparatus controlling means characterised by including connections to said timer and weight measurement apparatus to obtain data therefrom, and able to perform calculations involving this data based on a stored sequence of procedures, and including outgoing communication means allowing control of the spigot issuing the delivered material; and optionally said controlling means able to perform diagnostic functions;

the automated dispensing apparatus being further characterised such that the stored sequence of procedures in the controlling means effects the method for delivering the flowable comestible material According to another aspect of the present invention there is provided a method controlling the delivery of a portion of a flowable substance in which the substance and the receptacle containing it, is moved away from any delivery spigot or outlet.

According to another aspect of the present invention there is provided a method for controlling the delivery of a portion of a flowable substance in which corrections are made for variations in flow during any opening and/or closing operation of a delivery spigot or controlling valve.

According to another aspect of the present invention there is provided a method for controlling the delivery of a portion of a flowable substance in which said corrections for variations in flow during any opening and/or closing operation of a delivery spigot or controlling valve are made either continuously or at discrete steps throughout the delivery.

According to another aspect of the present invention there is provided a method for controlling the delivery of a portion of a flowable substance in which the substance is a non-dry, non-granular substance.

Accordingly to another aspect of the present invention there is provided a method for controlling the delivery of a portion of a flowable substance in which the substance is preferably a comestible product having a medium to thick consistency, such as a frozen confection, a churned substance, and/or a pulped or puréed substance.

Accordingly to another aspect of the present invention there is provided a method for controlling the delivery of a portion of a flowable substance in which the substance is preferably a comestible product such as a beverage.

According to another aspect of the present invention there is provided a method for controlling the delivery of a portion of a flowable substance in which a substance is delivered into a receptacle, including at least one of a cup, cone, or dish.

According to a further aspect of the present invention there is provided dispensing apparatus controlled by a method substantially as described above.

According to a further aspect of the present invention there is provided the use of a method, substantially as described above for controlling automated apparatus for the delivery of flowable material.

According to a further aspect of the present invention there is provided a dispensed product that has been dispensed in a manner according to a method substantially as described above.

The main portion of the invention comprises a method for controlling dispensing apparatus to deliver portions of the flowable substance in either or both a continuous pour/delivery and a discrete step pour/delivery. In the latter scenario, a series of discrete steps may be required to obtain a portion of the flowable product having a preferred target weight. Preferred features of shape of the delivered portion may also be determined.

The flowable substance shall now be referred to as a frozen confection, such as soft serve ice cream, and so forth. However, it should be appreciated the use of the term frozen confection is for ease of use only, and this invention may be adapted for use with any suitable flowable substance. For example the invention may have application in the automated delivery of preferred quantities of beverages, soups, and so forth.

However, for simplicity of description, unless stated otherwise, the ensuing description and examples will relate to a flowable material such as a frozen confection e.g. soft serve ice cream.

The system invented by the applicant is designed to adapt to variables in the delivery of the flowable substance within reason. The variables applicable include pressure, temperature, viscosity and mix constitution, although other variables may be relevant. Such adaptation is achieved by the system differentiating between weight and pressure through retrospective analysis. A timed delivery is also relevant.

In the preferred embodiments of the present invention, the receptacle/vessel into which the flowable product is delivered includes either a cone, or a cup. However, the system may be adapted to enable other vessels to be, such as dishes and so forth.

For the option of a discrete step delivery, the general principle is to deliver a first lot of material which is less than the target amount, to then accurately weigh or otherwise determine the amount of material delivered and the time taken to deliver that amount, and after subsequently determining how much more material is required to make the total up to the target value, deliver the material for a further calculated amount of time.

The amount of the first lot delivered is arbitrary and the amount delivered only approximate. Typically the arrangement will be set up so that the amount of ice cream delivered in the first lot is sufficient for an accurate analysis of weight and time to be performed—as well as reducing any error due to variation in flow rate during the opening and closing of any controlling valve or other factors introducing error. Also, it should not be so close to the target value that the approximate nature of the delivery of the first portion causes it to occasionally exceed the target value.

Similarly, it should be sufficiently below the target value so that the associated machinery is able to accurately deliver the final top-up portion or portions.

While factors such as the total portion size will be a consideration, as well as the characteristics of the delivery equipment, it is anticipated in most cases that the size of the first lot will be chosen to be at least 60% of the target value, and often in excess of 75%. Similarly, the size of the first lot will typically not exceed 95% of the target value, and often below 85–90% of the target value.

In principle, a first lot of ice cream is typically delivered within the preferred range of the final target value. Typically this will be achieved by controlling a valve or spigot responsible for the flow of ice cream from the churn or associated machinery. A number of methods may be relied upon to apportion the first lot. However, as the exact volume of the first lot need only be approximate, non-sophisticated methods may be used.

In one embodiment a dynamic weight reading is continually taken during delivery of the ice cream. This actual weight will be less than accurate due to various influences including the force of the material coming from the spigot, and also problems associated with the continuous bridge of product from the delivery spigot to the vessel. However, such dynamic readings are sufficient to enable a first lot to be delivered. The issue of the continuous bridge of product will be discussed again later, specifically with reference to addressing the inaccuracy in embodiments in which the discrete step (or multiple step) pour approach is used, or in which a more continuous (or single) pour approach is preferred.

Another technique is to rely on time to deliver the first portion i.e. keep the control valve open for a particular period of time. However, where the same apparatus may be used for different products (whether it be on different days or being drawn from different reservoirs), or where there is variation in characteristics of the products (such as due to viscosity), it may not be possible to rely on a single time reading as being accurate all of the time.

However this may be addressed by methods such as using data collected from previous dispensing runs, to estimate the length of time required for the valve to remain open to deliver the preferred amount of ice cream for the first lot. This previous data may be data averaged or gathered over a significant period of time, or may merely be data based on the last time the machine was run for that particular product or reservoir, such as the delivery operation(s) immediately preceding.

Various mathematical analyses may be incorporated into such calculations, though the approximate nature of this first step does not normally require a high degree of precision.

In yet other preferred embodiments, pressure differentials may be used for determining the delivery of the flowable product to a preferred portion target weight Once the first lot has been delivered, an accurate reading of the weight, or some other parameter such as volume, is then made. It is envisaged weight will be the most commonly measured characteristic, due partly to the ease by which this parameter may be measured.

In order to accurately measure weight, it may be important that ice cream is not still being delivered to the receptacle/holding vessel. Similarly, it may be important that there is not a bridge of ice cream between the receptacle/vessel and the delivery spigot or spout. Accordingly, where this represents a problem, the bridge should be broken—either by moving the receptacle/vessel and spigot/spout away from each other or physically breaking the bridge by a shutter etc.

An accurate reading of the weight of dispensed ice cream is then taken. The time taken for the delivery of this amount will have been recorded during the delivery operation. The result is that the exact flow of weight per unit time can be gauged for the ice cream. Regardless of any viscosity (of the ice cream) variations over time, an exact and current measure of the flow is thus obtained.

Corrections may be made. For instance, depending on the speed of operation of any control valve, a small correction may be introduced for changing the flow rate during the brief interval during which the valve opens and closes. Depending on the apparatus, this may be negligible and no correction necessary. In other cases, correction may be made based on trials and gathered data (for example).

Other corrections may also be introduced. For instance, breaking of the bridge of any product may introduce some uncertainty. Providing that the breaking of any bridge is performed consistently, corrections may be introduced. This may depend upon the nature of the product and the likelihood of it forming a peak from the delivery spigot. In instances where shutters are used to close off the delivery spigot, more consistent results may be achievable and no correction may be required. Where a correction is introduced, it may be based on the results of data from previous trials, and so forth.

As an accurate determination of the weight of the first lot has been made, the weight required to make the dispensed first lot up to the target value can also be easily calculated. To this value may also be added further corrections, such as a safety margin to ensure the weight of the total dispensed portion does not fall below the target value.

It is envisaged in most cases that the target value will be a minimal value to be always exceeded. It is envisaged any such correction will be influenced by factors introducing errors, such as the smallest possible increment the delivery apparatus can accurately deliver. Such corrections may also be based on gathered data and/or experiments. It is also possible data may be gathered during on-going dispensing operations, and analysed. This may provide data such as the variance, standard deviation, and so forth, which may be factored into any correction.

Having gathered this data, it is then a simple calculation to determine the period that the delivery valve or spigot should remain open to deliver the remaining amount of ice cream to reach the preferred target value.

Accordingly, this value is calculated and a top-up portion of ice cream delivered.

Normally this would represent the last step of a simple embodiment of the present invention, though further steps may be incorporated. For instance, the final portion may also be accurately weighed to ensure the target value or range has been satisfied. If the total delivered portion falls below a minimum value, then further ice cream may be delivered. A similar calculation to determine how much more material needs to be delivered, and the time taken to deliver this amount of material, may also be performed. This is essentially a repetition of several of the previous steps and may optionally be repeated as often as is necessary to ensure the total delivered portion is made up to a minimum (or other target) value.

It is envisaged this extended reiterative process will not often be used, in the interest of time, for many uses of the present invention. However it, or at least a final weighing, may be included as a final quality control check for all or some delivery operations.

It is envisaged in most cases, the first top-up will be sufficient to deliver the required amount of material to meet the target value. If subsequent top-ups are required these may be probably and normally due to a one-off situation, or symptomatic of an error with the equipment (for example an air lock and so forth).

Some diagnostic abilities may be incorporated into the data—for instance an air lock or empty reservoir may be signified by very little material issuing over a predetermined period of time. This may be readily detectable and a suitable alert presented to the operator to advise them there is a malfunction causing no ice cream or other material to issue.

As can be appreciated, there are a number of variations possible to the basic principles of the methodology thus far described. Data may be manipulated in different ways to provide additional information to the user. That data is collected means it may also be analysed to provide on-going information to optimise the process. This may include updating or modifying any correction or values introduced into any analysis during operation. Similarly, such information may be stored for subsequent downloading to, and analysis by, apparatus external to the controlling machinery. Such an arrangement may be used for quality control checking and/or routine maintenance interrogations.

As can be appreciated, the ability to monitor and adapt itself to differing characteristics mean the algorithm is able to compensate for variations in products being delivered, and/or variations in the same product over time. This may mean that the machine can be essentially self-calibrating, correcting itself each time a delivery operation is performed.

In other preferred embodiments the algorithm is developed to accomplish a single pour, rather than a pour incorporating discrete steps (or multiple step approach). The primary strategy remains an application of the assessment of the weight, pressure and time parameters in the delivery of the flowable product. However, the assessment is conducted continuously during the delivery of the product.

There may be a slowing down in the pour rate at stages of the delivery (accomplished by the closure or partial closure of the spigot), dependent on the type of flowable product being delivered. However, the need to cease delivery of (for example) the ice cream, or to break the bridge (of ice cream) between the delivery spigot and the vessel is not typically required in this embodiment.

The principles of operation relating to a more continuous delivery of the flowable product are now described with reference to the delivery of the flowable product into each of a cone and a cup. However, it should be appreciated the invention may be directed to delivery of portions into other preferred vessels.

Where the vessel for receiving the portion of flowable product is a cone, the cone is loaded in a ready-for-pour position. This position is in fact a raised position in a machine designed for the delivery of flowable substances. Where frozen confectionery is the flowable substance delivered, the machine is an ice cream vending machine.

When the operation is initiated, the weight system of the machine is auto-zeroed to counter errors such as build-up of product on the weigh arm. A spigot or controlling valve, for controlling the flow of the flowable substance (ice cream) from the churn or associated machinery, is moved to a nominated position. This nominated position is typically the "average" position as determined from previous pours, plus a fixed offset.

As discussed previously, the machine is preferably capable of self-diagnosis. Therefore, if no flow is detected within a time-out period, mechanical or user problems are assumed and the delivery (or vend) is cancelled.

Alternately, as soon as a first lot of substance (for example 10 grams of product) is delivered, a timer is started to assess the total dispensing time, and the vessel positioning system is initiated. The vessel positioning system (or cone positioning system) attempts to neutralise pressure effects during the delivery of the flowable substance. The neutralisation of the pressure effect is achieved by the system calculating a vertical position for the cone (based on previous experience).

A vertical transport actuator responsible for cone positioning is driven in a variable-speed unidirectional servo loop to facilitate the preferred position of the cone.

As the system reaches a series of benchmarks in the latter 25% of the weight profile of the preferred portion, the spigot aperture is stepped smaller by subtle degrees to increase the accuracy of the cut-off point. There is however, no defined cut-off during the delivery. Rather, the defined cut-off occurs at the end of the delivery. Accordingly, this method is a compromise between accuracy of the cut-off point (greatly affected by the speed of the spigot actuator), and overall delivery speed. If there is an excessive "dwell" period between each successive benchmark point, the cycle will be aborted.

The final cut-off point is the desired portion size. At this point there is triggered a simultaneously raising of the transport (to a position computed as a fixed ratio to the downward travel distance in use), closure of the spigot, and halting of the dispense timer. This upward travel of the transport improves the shape of the portion by forcing the "plug" of product in the plunger area of the spigot onto to the top of the delivered portion.

The cone is then lowered clear of the spigot, movement is stopped, and the final result is weighed. The pour or delivery is then completed. Completion of the delivery is usually accompanied by an indicator system on the delivery machine (such as a green "complete" light) to alert the operator to the completed cycle.

Since the weighing system is used intensively from the commencement of the delivery, through to the final weighing of the delivered portion, it is preferable the system not be interfered with during that period. Nevertheless, the system is preferably designed to adapt after such interference, although several subsequent deliveries may be disrupted.

Upon completion the delivery system is able to assess the affect of pressure on the final stages of the delivery by comparing the final weight (pressure free) of the cone and portion of the flowable substance to the trigger weight (the initial weight, possibly combined with pressure).

If the portion delivered is underweight, a pressure effect is assumed, and an adjustment is made to the vertical transport travel co-efficient of the algorithm directing the delivery. This adjustment is proportional to the degree of pressure determined.

Conversely, if the result is an overweight portion, a pressure effect is not apparent. Any error due to the volume of product suspended from the spigot at the end of the cycle is instead reduced by decreasing the transport co-efficient, thereby reducing subsequent travel, and therefore suspended product volume and weight off the spigot.

The time taken in the delivery cycle is also assessed upon completion of the delivered portion. The "average" spigot position to be used in the next delivery is adjusted within an operating window to increase delivery speed, but to also attempt to minimise the consequences of excessive speed on portioning accuracy.

The weight system also detects removal of the product. During an idle time (that is any time the weight system registers less than a pre-set threshold for a timed period) the transport is driven to the upper or homed position. The preferred time period is approximately 1.5 seconds.

In preferred embodiments of this present invention a number of additional features designed to further improve the final delivered portion of the flowable product into a cone include:

a) An additional adaptive parameter for "learning" the flow rates of the product throughout a pour. The ability to "learn" the flow rate per delivery contributes to minimising the possibility of the vending (delivery cycle) stalling due to insufficient flow of the flowable product.

b) An additional adaptive parameter to adjust (within a predetermined range) the target weight for the purposes of long-term yield optimisation.

c) Changes to the transfer characteristics of the vertical positioner, to improve the shape of the delivered portion (may be via use of the pressure effect).

d) Improvement of operation of the machine to accommodate mixes of flowable products having a higher viscosity than for example soft serve ice cream.

Where the vessel into which the flowable product is delivered is a cup, the cup is kept stationery throughout the delivery of the flowable product. In this situation, accuracy of the delivered portion is completely dependent on a zero pressure effect in the first 50% of the weight of product delivered. Whilst this stage is applicable to flowable products having different viscosities, it is acknowledged this approach may be more successful with low-viscosity products.

The principles of operation of delivery of the flowable product into a cup similarly require the system to auto-zero in the same way as occurs when a delivery cycle for a cone is initiated. The spigot aperture at this point is typically opened to a static position. A timer is then started once the initial weight (for example 10-gram) threshold has been achieved. Similarly, the delivery cycle is terminated if the delivered product is not detected within a time-out period.

During delivery of the flowable product into the cup, the mid-point (approximately) weight is detected. The system then reverses the timer, and continues the delivery for a time period identical to the first half of the cycle.

Once the delivery is completed, the spigot is closed and the filled vessel is moved down towards a position enabling the vessel to be removed. Once the vessel is removed, the transport auto-homes as per the cone cycle.

In preferred embodiments of this present invention additional features designed to further improve the final delivered portion of the flowable product into a cut include:

a) The addition of an adaptive parameter to enable the static spigot position used to be adjusted for subsequent pours as required to increase or decrease the flow rate to obtain a target compromise between the dispensing time and portioning accuracy.

b) Incorporation of a pressure-onset detection means (if preferred) to provide a volumetric response.

Accordingly, features of the present invention are designed to enable a vending machine for flowable products (particularly frozen confections) to deliver portions into a vessel such as a cone or cup, in such a way as to minimise variations in the portions on successive deliveries (pours). Repetitive delivery of standard size portions having a preferred consistency, preferred weight, and within an acceptable delivery time is the aim of this invention.

Accordingly, the typical arrangement will be set up so the amount of ice cream delivered in the portion is sufficient for an accurate analysis of weight and time to be performed. The system is designed to compensate by reducing errors due to variation of flow rate during the opening and closing of any controlling valve, or due to other factors introducing error. Accordingly, on successive deliveries, the system is designed to readjust and compensate for variations detected in the target value as a result of such error-introducing factors.

The delivery of a portion of flowable product (ice cream) within a preferred target value range will be achieved by controlling a valve or spigot responsible for the flow of the ice cream from the churn or associated machinery.

The inclusion of a dynamic weight reading continually taken during delivery of the ice cream facilitates the delivery of a portion of the flowable product within the final target value range.

The method of delivering the ice cream to the vessel in a more continuous stream attempts to minimise any inaccuracies in the final target weight of the delivered portion that may become a problem in the delivery of particular flowable products (particularly soft serve ice cream). Such inaccuracies may be due to influences such as the force of the material coming from the spigot, and also problems associated with the continuous bridge of product from the delivery spigot to the vessel. However, the discrete step (or multiple pour) approach may be preferable for other flowable products (such as beverages, including soups).

Data collected from previous dispensing runs is continually assessed to ensure successive deliveries produce portions within the preferred target value range.

In preferred embodiments, the same apparatus may be used for delivering different products either on different days or for products being drawn from different reservoirs on the same day. The method of continual assessment of collected data is designed to enable the length of time required for the valve to remain open (to deliver the preferred amount of product) to be estimated.

The compromise desired is that between a delivered portion of the flowable product of a preferred target value within a preferred time frame. The data collected during the continually assessed pour means that on-going information is provided to optimise the process.

In various embodiments, the previous data may be data averaged, or gathered over a significant period of time, or may merely be data based on the last time the machine was run during a delivery operation immediately proceeding the present delivery. The mathematical analysis incorporated into such calculation is designed to preferably improve the degree of precision within repeated deliveries of the flowable product.

As can be appreciated, monitoring and independent adjustment to differing characteristics means the mathematical algorithm controlling delivery of the flowable product to both the cone and the cup is able to compensate for variations in products being delivered and/or variations in the same product delivered over time.

Accordingly, it is an aim of the invention that the machine be self-calibrating, correcting itself each time a delivery operation is performed. This is achieved by the nature of the algorithm controlling and operating the system.

It is again therefore preferable the pour methods include diagnostic systems capable of detecting and alerting an operator to possible malfunction in the delivery of the flowable product.

Accordingly, also included within the scope of this invention is software following the methodology (for the continuous pour and the discrete step pour) and for putting into effect the methodology.

Also within the scope of the invention is apparatus for the delivery of flowable materials controlled in the manner of the method described thus far. It is envisaged that using the available dispensing machinery, it would be within the scope of a skilled addressee of the art to implement the methodology of the present invention to control a spigot of a dispensing machine, given the description herein.

It is envisaged the dispensing apparatus for automated delivery of the flowable product may be incorporated (retrofitted) into existing vending machines, or be incorporated into new machines specifically designed to accommodate such dispensing apparatus.

It is further envisaged this invention will have practical application in automated and/or semi-automated vending machines for delivering a pre-determined amount of a substance, such as ice cream and frozen confections, into appropriate vessels while the machine is partially attended or unattended.

Such vending machines may be used to dispense portions of ice cream, thick shakes, soups, soft drinks and so forth particularly in fast-food outlets, although stand alone machines may be used in shopping malls and so forth. Other uses include dispensing portions of alcoholic beverages, such as beers, spirit mixes, cocktails and so forth in appropriate outlets.

It is also envisaged that the apparatus, software and controlling equipment may be modified to allow selection of preferred products and differently sized and/or shaped portions as required.

BRIEF DESCRIPTION OF DRAWINGS

Further aspects of the present invention will become apparent from the following description which is given by way of example only and with reference to the accompanying drawings in which:

FIG. 4 is a block diagram of a preferred method according to another embodiment of the present invention; and FIG. 5 is a schematic diagram of one program structure for Lab View; and FIG. 6 is a time graph of examples of spigot timing signals.

BEST MODES FOR CARRYING OUT THE INVENTION

With reference to the drawings by way of example only there is provided a method for controlling delivery of a portion of a flowable substance. The flowable substance (preferably soft serve ice cream and other frozen confections) is delivered via an automated (fully or semi-automated) system, such as an automated soft serve ice cream (or other products) vending machine, particularly for use in fast food outlets and so forth.

Operation of the automated vending machine is controlled via software (see FIGS. 4 and 5 for a block diagram of the operation and a schematic diagram of one program structure relating to the software). The software is also designed to effect the required delivery of the flowable product, to preferably detect possible malfunctions in the operation of the machine or in the delivery of the flowable product, and to alert an operator of the machine to such.

The machine is designed to be self-calibrating in the delivery of the portion of product, correcting itself each time a delivery operation is performed. This is achievable because of the algorithm of the software controlling and operating the system.

The same controlling and operating system monitors, adjusts and controls the delivery of the flowable product into a preferred receptacle or vessel (whilst generally a cup and/or cone, any suitable vessel may be used depending on the product).

Whilst the description for simplicity refers to the delivery of soft serve ice cream from an ice cream vending machine, it should be appreciated that this is but one application of the present invention.

Figure 1:
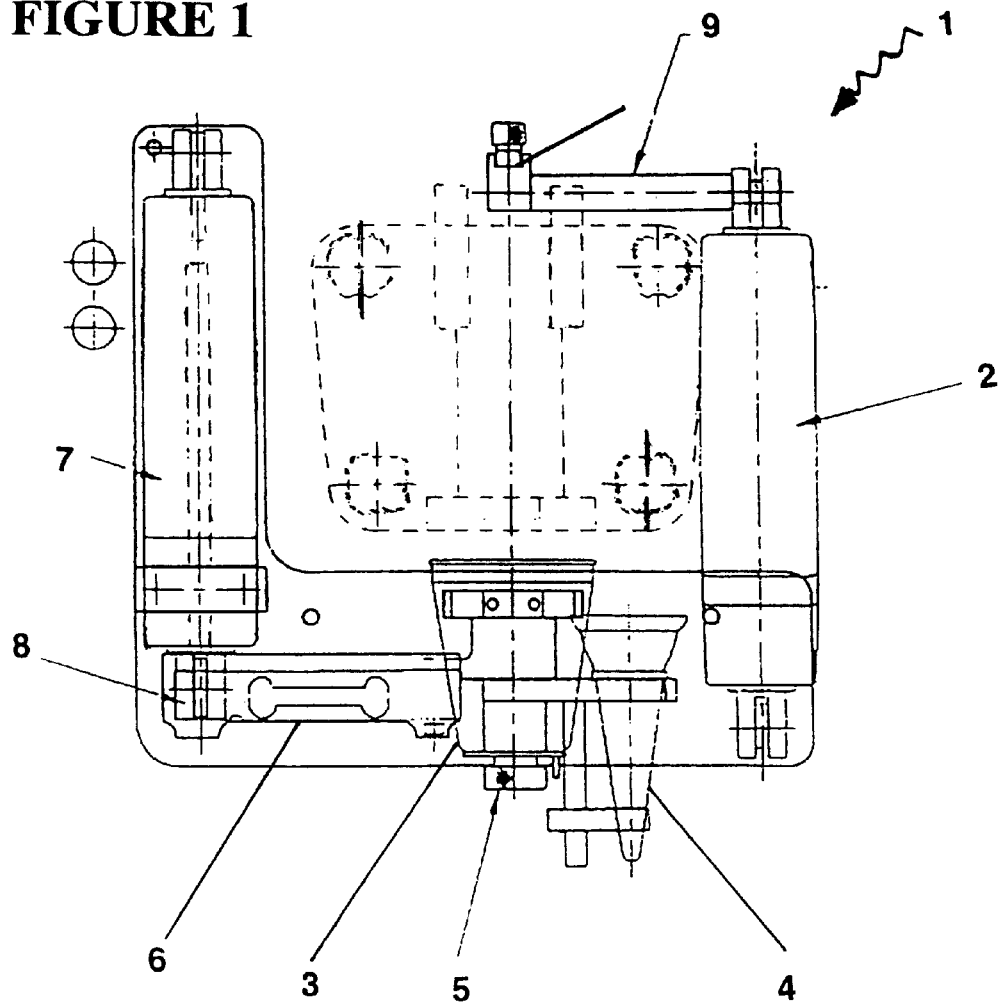
FIG. 1 is a diagrammatic cross-sectional view of the portion control device including the vessel lift activator and the spigot actuator, and vessel holder in one preferred embodiment of the present invention.
Figure 7:
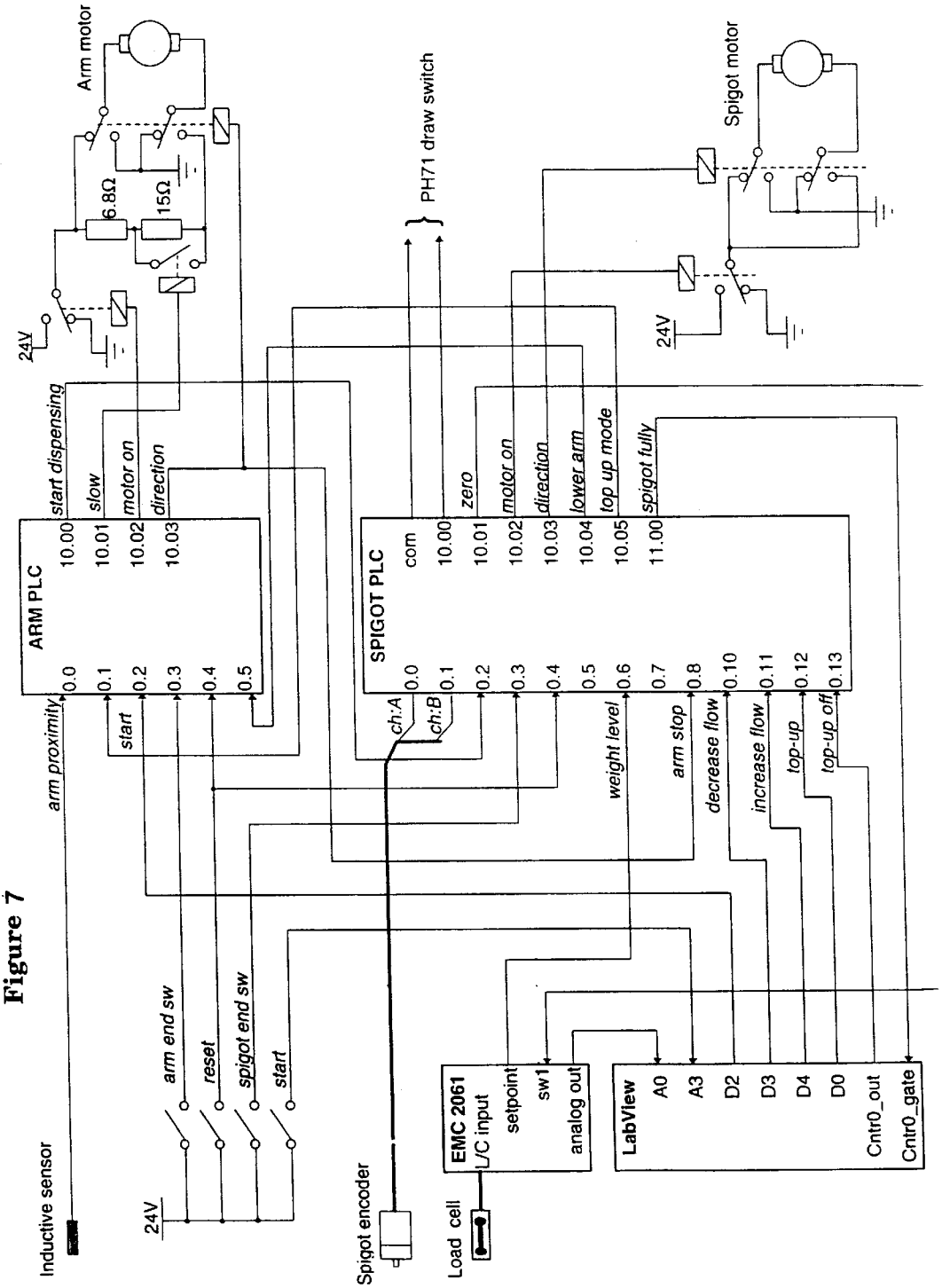
FIG. 7 is a wiring schematic.

The flowable product is delivered via operation of the portion control device (1) (as shown in FIG. 1) of the machine (not shown in its entirety). The configuration and arrangement of the portion control device may however differ depending on the machinery with which it is used, and the product being delivered. FIG. 7 provides an example of one configuration of a wiring schematic for the portion control device.

Figure 2:
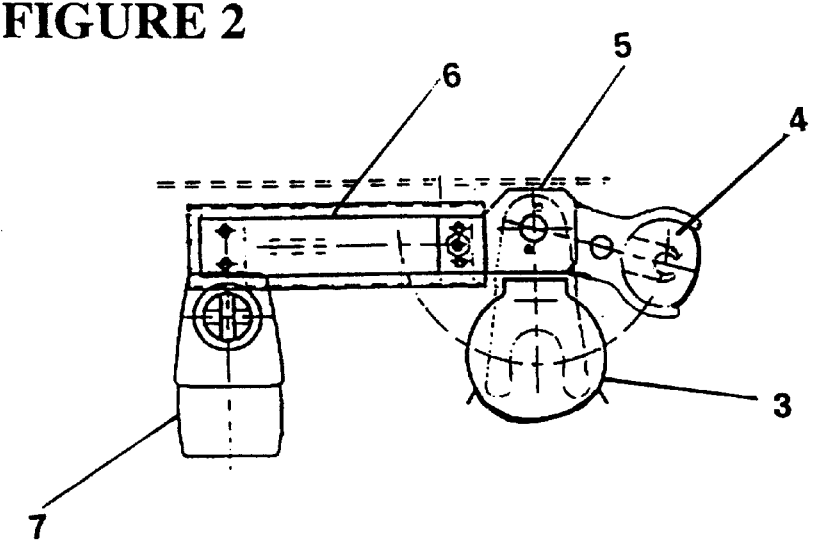
FIG. 2 is a top plan view of the mechanism for delivering or transporting the vessel into the required position to receive the delivered portion of the flowable product.

The portion control device (1) incorporates a spigot actuator (2) (shown also in FIG. 3) which activates operation of release of the product (ice cream) from the churn of the machine. FIG. 6 diagrammatically illustrates the spigot timing signals in accordance with the multiple pour embodiment of the invention. A cup (3) or cone (4) in a cup/cone holder (5) (also shown in FIG. 2) is also included. Delivery of the ice cream in to a cup (3) or cone (4) is accompanied by movement of the cup/cone transporter arm (6) to ensure the cup (3) or cone (4) is in the required position to receive the product.

The position of the cone (4), during delivery and on completion of a pour, is controlled/determined by activation of the cone lift actuator (7) which in turn receives feedback on the position and status (filled/unfilled) of the cone (4) from a load cell (8). The cone and spigot positioning systems incorporate DC motor/gear reduced worm drive systems. However, any suitable system may be adapted for use with the invention. The position sensing system for sensing the position of the cone and spigot may include a two-channel optical based encoder, a single channel magnetic based strobe, or any other suitable position sensing system that may be used with, or adapted for use with this invention.

An advantage of a strobe system is that it lacks the inherent direction indication of a quadrature encoder. Accordingly, the software used with the invention for example, is able to adapt to the prevalent motor drive polarity whilst processing the strobe pulses.

Portioning Algorithm for the Multiple Pour Embodiment

The section provides an overview of the portioning algorithm applied.

In summary, the implemented control strategy is employing a two-part portion dispensing method based on a combined weight-time control concept.

The first part of the portion is dispensed and cut off when a weight limit is reached. The dynamic weight monitored during dispensing is a combination of the actual gravity force and dispensing related forced on the load cell.

After completing the first part of the dispensing cycle, the ice cream is detached from the spigot and the actual weight and duration of dispensing is recorded.

The second portion (top up) is dispensed based on the calculated time required to fill the remainder of the portion to the target weight. Lab View program is used to monitor the weight value and measure the dispensing times.

Initial Fill Cycle for the Cone Portion Delivery

Once the cone transporter arm has reached the position for dispensing, the spigot opens to a pre-set position (18.1 mm or 4300 encoder counts), and ice cream starts to flow. The initial filling process is terminated by triggering the weight limit that has been set to approximately 150% of the target weight (Table 1 below). This setting reflects the combination of gravity and dispensing related forces.

The spigot closes and the cone is lowered from the dispensing position so that the ice cream is essentially detached from the spigot. After the first dispensing, the static weight is measured $w_1$ and the dispensing duration $t_1$ is recorded.

The weight limit levels are set according to the following table.

TABLE 1

Weight limits for EMC controller during the initial filling cycle

| Portion Size | Weight level (EMC controller) |
|---|---|
| 80 g | 100 g |
| 100 g | 140 g |
| 120 g | 180 g |

Top-Up Cycle

From these two readings a delivery rate is calculated. The duration $t_2$ for the second (top-up) filling to reach the target weight $w_1$ is then calculated on this basis. The spigot opens again to a second pre-set (top-up) position that is updated from the initial value of 18.2 mm (4300 counts—measured from end of travel). The spigot closes after the calculated duration for the dispensing. The transport arm is lowered again (to detach the ice cream) for the final weight reading.

$$t_2 = \left(\frac{w_t - w_1}{w_1}\right) * t_1$$

This method is based on the assumption that the flow rate during top-up is very similar to the first fill if the spigot is opened to the same position for both fills. However, local viscosity and consistency changes of the product can cause flow rate variation. Also the top-up flow may be restricted depending on how the first part of the portion has settled on the cone.

Self Correcting/Adapting Feature

The self-adapting algorithm adjusts the second flow rate for changed situations when the weight tolerance is exceeded. These changes can be caused by many draws within short time intervals, long term changes of the product during the day, PH71 operation mode changes from stand-by to auto and after heat treatment.

If the final result exceeds 3% weight variation a signal is generated to adjust the opening position of the spigot to open by a fixed increment (0.2 mm or 50 encoder counts of the driving screw) more or less depending on the previous weight result.

This method of self-adaptation works very well as it increased the capability of the control system for subsequent draws to respond swiftly to changes caused by variations in the product and differing demands.

Summary of Results

A test series of portion samples have been recorded and evaluated. From 724 recorded samples 85% have been within the ±5% range for the tested weight ranges of 80, 100 and 120 g, additional 9% are in the 7–10% range and further 6% are within 7–10%, and less than 0.5% of the samples have resulted in more than 10% deviation. Maximum deviation were—14.4% and +10.1%.

The total target weight for all 724 samples amounts to 74 034 g. The actual dispensed ice cream exceeded the target value by only 454 g which is approximately 0.6% average variation.

TABLE 2

Summary results of portioning tests

| Target Weight | Total no. of samples | ±5% | ±5–7% | ±7–10% | >±10% |
|---|---|---|---|---|---|
| 80 g | 248 | 77.8% | 12.1% | 9.3% | 0.8% |
| 120 g | 307 | 86.6% | 8.8% | 4.2% | 0.3% |
| 100 g | 169 | 91.1% | 5.3% | 3.6% | 0.0% |
| Overall | 724 | 84.7% | 9.1% | 5.8% | 0.4% |
| Final samples | 161 | 91.3% | 5.6% | 3.1% | 0% |

The results are approximately presented in test date sequence. Note the improvement with time. Final samples included the top-up flow adjustment.

TABLE 3

Average of dispensed weight

| Total weight | 73580 | 100% |
|---|---|---|
| Actual weight | 74034 | |
| Deviation | 454 | 0.6% |

The data represent good runs excluding data with assignable causes for deviation such as erroneous weight readings, spigot jamming and mechanical friction problems. However, the resulting data demonstrate clearly that the weight specifications can be achieved in a commercial system by employing this control method. Note in particular the progress during the development. The Final sample figures in Table 2 show the latest development with the implemented flow-adjustment algorithm. Table 3 shows how close the target weight to the actual dispensed weight is. The average deviation from the target weight is significantly less than 1%.

Figure 8:
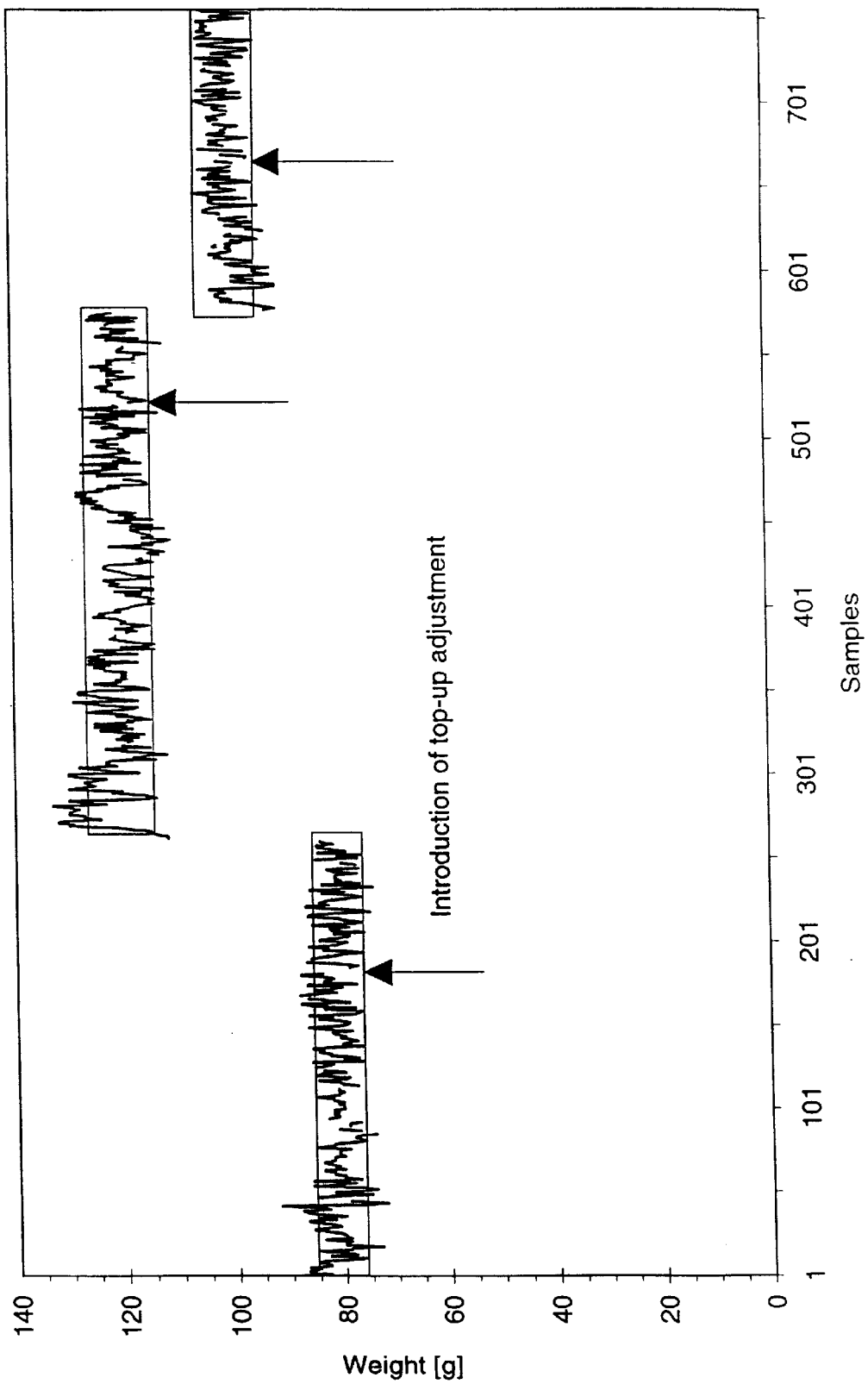
FIG. 8 is a graph of weight variation for the multiple pour embodiment based on collected data.
Figure 9:
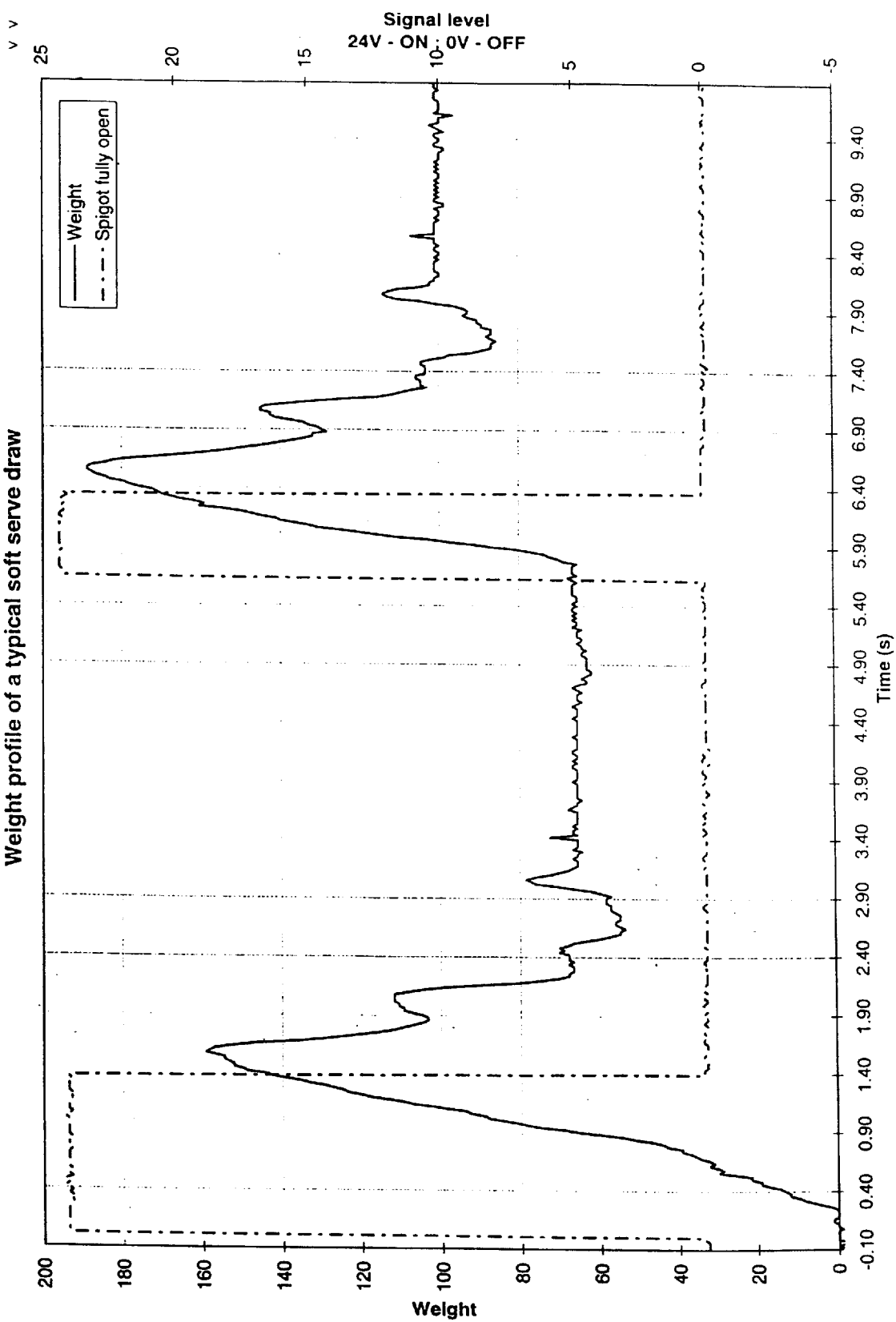
FIG. 9 is a graph of a weight profile of a typical soft serve draw using the multiple pour embodiment.

FIGS. 8 and 9 are graphs of weight variation and weight profiles of soft serve ice cream portions delivered via the multiple pour embodiment, based on collected data.

Common Observations

An increased initial flow rate is observed e.g. after a long pause to the next draw-off, after the changeover from stand-by to auto mode and after heat treatment. Directly after the initial priming of the machine the flow rate seems to be slow. A series of frequent draw-offs tends to slow down the flow rate as well. Faster flow rates tend to cause larger portions and vice versa.

The self-correcting feature of the portion control algorithm allows a compensation for restricted variation of the flow rate by appropriate adjustments of the top-up period, right down to zero (refer to sample data records with a $t_2$ entry of zero). Very small adjustment periods (i.e. below 0.3 sec) tend to produce additional weight due to the mechanical reaction time of the spigot mechanism. This will be compensated at the next filling by decreased top-up flow which will bring the final portion weight closer down to the target.

Other effects include over-compensation, where the altered top-up flow resulted in a final weight slightly over the 5% margin. This factor is reflected in the fact that the 5 to 6% weight variation range is represented in 13% of the recorded samples.

By optimising the flow rate adjustment (with an increment currently set at 50 position counts representing approximately 0.2 mm spigot travel) a compromise can be reached between the speed of adaptation (i.e. how many cycles it takes for the flow to get back within the tolerance band of the portion weight) and how accurate the fine adjustments are (i.e. how close and how long it takes for the end results to fall within the 3% weight range).

It is important to point out, that the success of this method relies on the weight ration (i.e. first fill-up: top-up). In order to reduce the margin of error, the first portion has to be significantly larger than the top-up portion in the order for example of an 80:20 percent ratio. Experiments have shown the margin or error increases as the ratio decreases. Any deviation from the first fill will contribute to the inaccuracy of the final weight. However, with the top-up portion much smaller than the initial fill the accuracy is greatly improved.

Hence, the recommendation is for the first fill weight limit and initial position of the cone to be adjusted so the first part of the dispensing cycle delivers around 70–80% of the target weight.

Control Operation

The laboratory set-up for the portion control consists of:
two low-budget Programmable Logic Controllers (PLC's), one for the arm motor arm-PLC, one for the spigot motor spigot-PLC,
electronic weighing system, EMC 2060A with relay and analogue output,
and a data-acquisition system, for example Lab View 4.0
The Programmable Logic Controllers (PLC) interact directly with the motors. The spigot close command is triggered by the EMC weight controller (initial fill) and by the timing signal from Lab View (top-up cycle).

Sequence Description of Portioning Method

The arm moves to dispensing position (sensor) with cone in place. The signal to open the spigot is activated.

When the spigot motor has reached the open position and the motor has stopped, a signal from the spigot-PLC is sent to Lab View to start timing.

When the selected weight level for the portion (Table 1) is reached, the weight controller (EMC) triggers the closure of the spigot.

As soon as the spigot motor activates and the spigot is not in dispensing position, a signal from the spigot-PLC to Lab View is sent to stop timing.

After the spigot is closed, the arm-PLC retracts the transport arm for approximately 30 mm to dislodge the ice cream from the nozzle of the spigot.

After a short delay, Lab View reads the settled weight (analogue signal from EMC controller) and calculates the opening time for the top-up.

Lab view sends a start signal to the spigot-PLC and the spigot opens for the top-up.

The spigot-PLC reads the correction signal from previous filling and the top-up position setting is adjusted.

On reaching the top-up spigot position, the Lab View timer is started.

After reaching the calculated time, Lab View sends stop signal to the spigot-PLC.

Once the spigot is closed, the arm-PLC retracts the transport arm for approximately 50 mm to dislodge the ice cream.

Lab View reads the settled final weight (analogue signal from EMC controller) and issues a correction signal, if the deviation is more than 3% (overfill to reduce flow rate or under-fill to increase flow rate).

After 3 minutes without draw-off, the spigot-PLC reduces the spigot opening by 100 counts or 0.4 mm.

After 10 minutes without draw-off, the spigot-PLC ignores any correction signal for the top-up position.

| Pseudo code of applied method | |
|---|---|
| Main program | |
| Wait until start button is on | |
| Move arm to fill position (sensor) | ;arm-PLC |
| Initial_fill | ;spigot-PLC |
|   Open spigot until enc>=inj_fill_position | |
|   Start timer | ;Lab View |
|   Wait until weight level trigger | |
|   Stop counter | ;Lab View |
|   Close spigot until end-switch on | |
| Lower arm for 0.5 sec | ;arm-PLC |
| Wait 1 sec | |
| Read Weight | ;Lab View |
| Calculate top up time | |
| Top_up | ;spigot-PLC |
|   If increase_flow signal is on, increment top-up-position | |
|   If decrease_flow signal is on, decrement top-up-position | |
|   Open spigot until enc>=top-up_position | |
|   Start timer | ;Lab View |
|   Wait until timer reached top-up time | |
|   Close spigot until end-switch on | ;spigot-PLC |
| Lower arm for 0.8 sec | ;arm-PLC |
| Wait 1 sec | ;to settle movement |
| Read weight | ;Lab View |
| If weight <3% of target weight then increase_flow on | |
| else if weight >3% of target weight then decrease_flow on | |
| else  increase_flow off | |
|       decrease_flow off | |
| endif End | |

Motor Control

The motors are controlled simply by switching on and off. As the motor load in both cases is approximately constant a simple electronic braking system with a small resistor for both motors can be used to achieve very repeatable positioning.

Dispensing Cycle

The dispensing cycle is started by a push button to initiate the Lab View program and to start the PLC cycle. The transporter arm moves up to the dispensing position, triggered by an inductive sensor. Once the position is reached the spigot cycle is started.

The second motor opens the spigot and moves to the initial fill position. This position is monitored by encoder reading and Lab View is signalled as to the start of the dispensing. The weight is monitored by the EMC controller and a signal to close the spigot is given to the spigot PLC after the weight limit for the selected target weight is reached. The spigot closes and Lab View records the timing. The arm then lowers approximately 30 mm on a fixed time bases. Lab View reads the weight and calculates the timing for the top-up duration.

A start signal is sent to the spigot PLC to move the spigot motor to the second fill position. Again, Lab View monitors the timing and issues a spigot close command to finish the dispensing cycle. The arm lowers again—this time by an additional 50 mm (time based) and Lab View records the final weight.

If the Final weight differs by more than 3% from the target weight, Lab View issues an 'adjust flow rate' signal to the spigot PLC for the second spigot position in the following dispensing cycle, with increased flow for underweight and decreased flow for over delivery. After 3 minutes both spigot positions (initial and top-up flow) are decreased to compensate for the expected decrease in viscosity. After 10 minutes the 'adjust flow rate' signal will be ignored as the conditions will have changed and the conclusion from the previous draw will not be valid.

| Technical details on spigot travel | |
|---|---|
| Screw pitch: | 1 mm |
| Encoder counts: | 16 per rev |
| Gearbox ratio: | 3.7:1 |
| Counts/mm screw travel: | 59.36 |
| With quadrature encoding | 237.44 encoder counts per mm screw travel. |

The lever arm is $62/82$ mm=1.32—in other words 1 mm of screw travel represents approx 0.75 mm spigot travel. Note, the screw motion follows an arc described by the lever. Consequently, the encoder counts are not linear to the actual spigot travel. The basic spigot position for the initial flow rate is set to 4300 counts to overall screw travel. The increment of the flow adjustment is set to 50 counts or approximately 0.2 mm. This value represents the minimum resolution required for accurate spigot positioning.

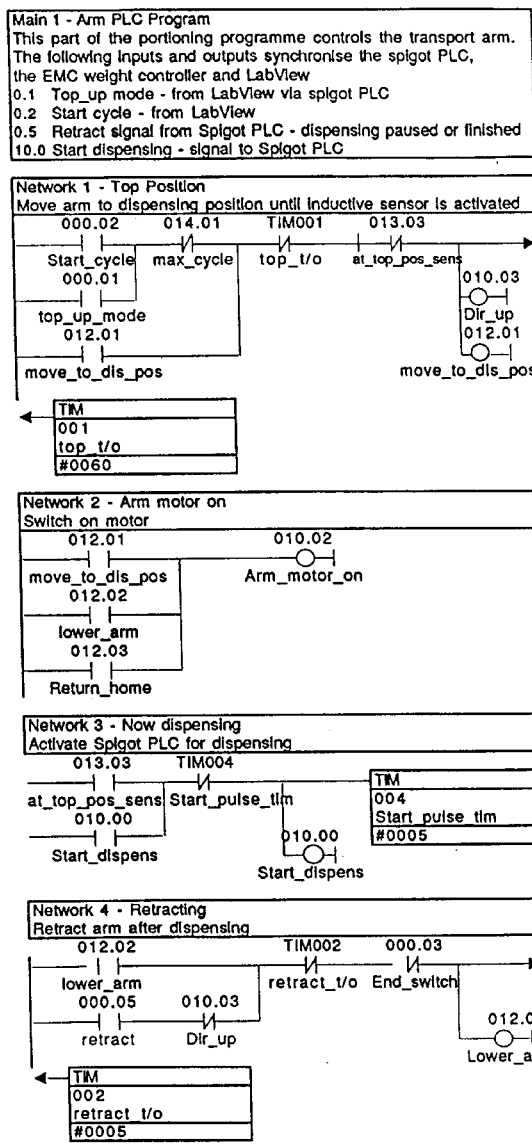

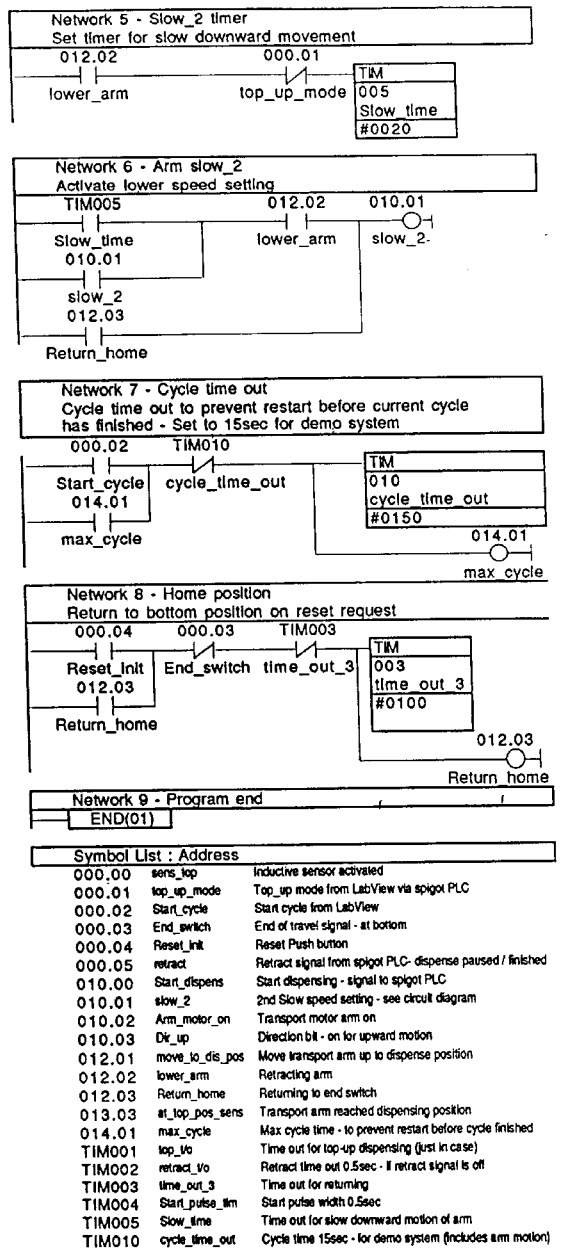

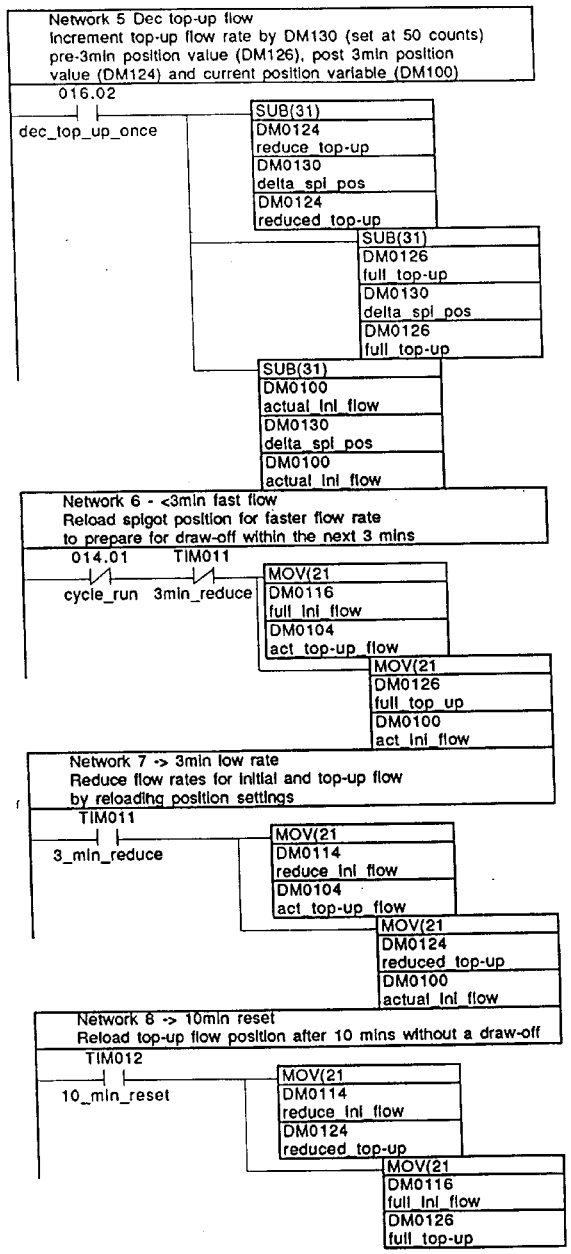

| Network 9 - End of program | |
|---|---|
| END(01) | |

| Symbol List : Address | | |
|---|---|---|
| 000.02 | start_dispens | Start dispensing cycle (from arm_PLC) |
| 000.03 | end_switch | End of spigot travel (spigot closed as reference) |
| 000.04 | reset | Close spigot and reset position counter |
| 000.06 | EMCweight_limit | Weight level reached (fromEMC controller) |
| 000.08 | arm_up | Arm reached top position |
| 000.10 | increase_top_up | increase top-up flow signal (LabView) |
| 000.11 | decrease_top_up | decrease top-up flow signal (LabView) |
| 001.00 | Lab_view_top_up | Start top-up dispensing |
| 001.01 | Lab_view_close | Stop top-up dispensing |
| 010.00 | draw_switch | PH71 Draw switch actuation |
| 010.01 | EMC_tare | Zero weight scale (EMC Controller) |
| 010.02 | Motor_on | Activate spigot motor |
| 010.03 | dir_up | Move direction up |
| 010.04 | retract_arm | Lower arm (to arm_PLC) |
| 011.00 | in_open_pos | Spigot reached open position |
| 012.01 | initial_open | Move spigot to open position |
| 012.03 | return_home | Close spigot |
| 012.04 | move_to_top_up | Move to spigot top-up position |
| 013.01 | at_ini_flow_pos | Initial fill position reached |
| 013.02 | at_top_up_pos | Top-up spigot position reached |
| 013.04 | nearly_closed | Spigot closed - not reached home position yet |
| 013.05 | Spigot_open | Spigot open position |
| 014.01 | cycle_run | Timer for cycle run - to prevent a too close restart |
| 016.01 | inc_top_up_once | Pulse for incrementing top-up flow position |
| 016.02 | dec_top_up_once | Pulse for decrementing top-up flow position |
| 017.01 | initial_fill | Initial fill mode (trigger by start-stopped by 13.04) |
| 017.02 | Top_up_mode | Top-up fill mode (by LabView timing) |
| 017.03 | Long_retract | Lower arm - extended period after dispense cycle |
| 248.00 | cur_spigot_pos | Current spigot position (encoder count register) |
| 252.00 | reset_cntr | Reset position register |
| 253.01 | always_on | System signal - always on |
| 253.15 | ini_signal | System start signal |
| 255.05 | >_greater_than | Last comparison result - greater than |
| 255.07 | <_less_than | Last comparison result - less than |
| TIM003 | top_t/o | Time out for fast flow position |
| TIM005 | Final_retract | Timer for lowering of arm (ca. 50mm) |
| TIM006 | retract_slow | Time for pulse interval to arm-PLC to retract arm |
| TIM007 | cycle_t/o | Cycle time out |
| TIM009 | top_up_t/o | Top-up cycle time out (max time for top-up) |
| TIM011 | 3_min_reduce | Timer for 3 min reduction of spigot position |
| TIM012 | 10_min_reset | Timer-ignoring instructions for changing top-up flow |
| DM0100 | actual_ini_flow | Position value used during initial dispense cycle |
| DM0102 | max_open_pos | Maximum flow rate position - physical limits (5000) |
| DM0104 | act_top_up_flow | Position value used during top up dispense cycle |
| DM0106 | top-up_max | Max position for top-up |
| DM0110 | Min_open_pos | Ice cream starts to flow above 3800 |
| DM0114 | reduce_ini_flow | Position value after 3 mins for initial dispensing |
| DM0116 | full-ini_flow | Position value for full flow of initial dispense |
| DM0120 | Low_threshold | Lower bound - near end switch |
| DM0122 | High_threshold | Upper bound - near end switch |
| DM0124 | reduced_top-up | Position value after 3 min for top up dispense |
| DM0126 | full_top-up | Position value for full flow rate in top-up mode |
| DM0130 | delta_spi_pos | Increment value for top-up flow adjustments |

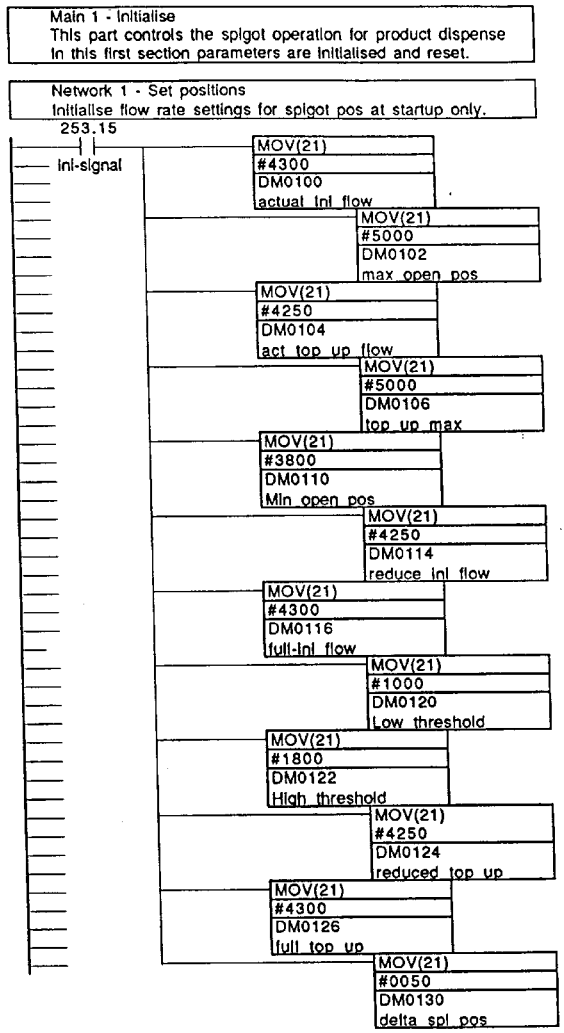

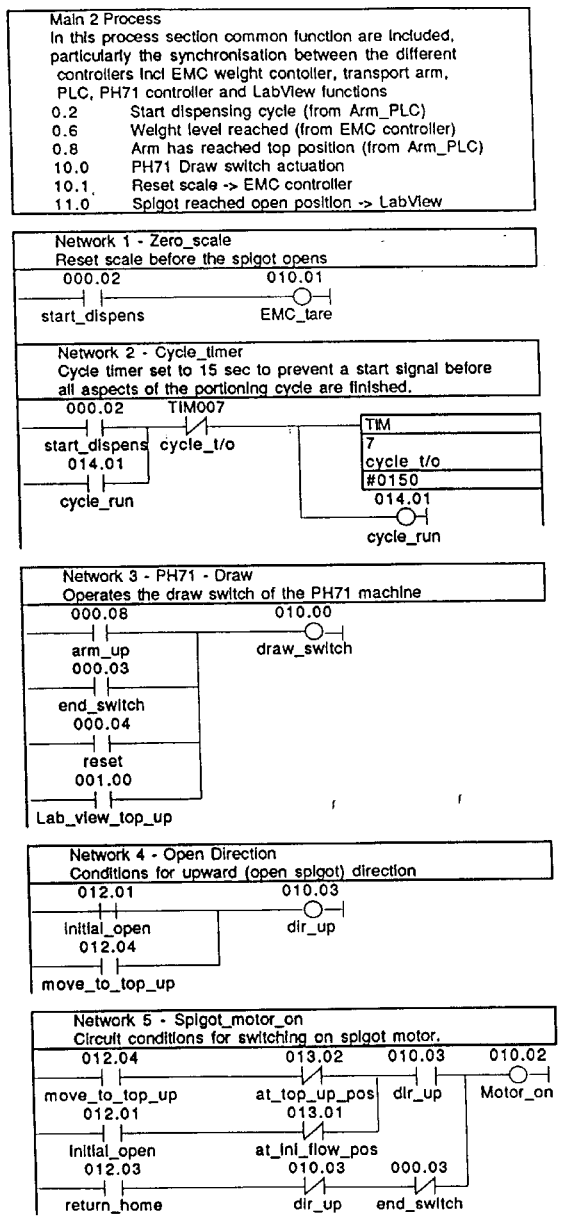

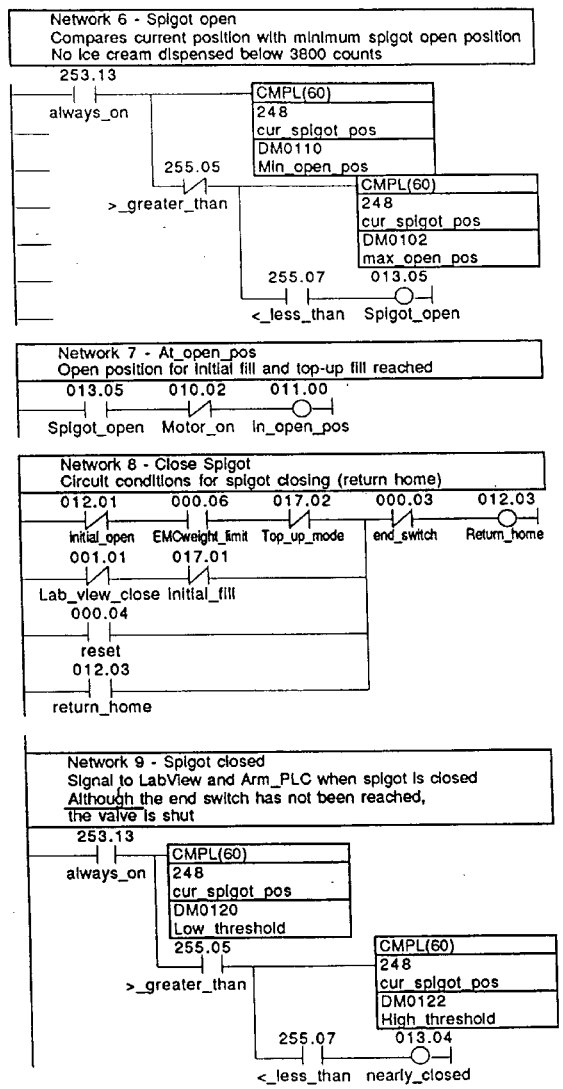

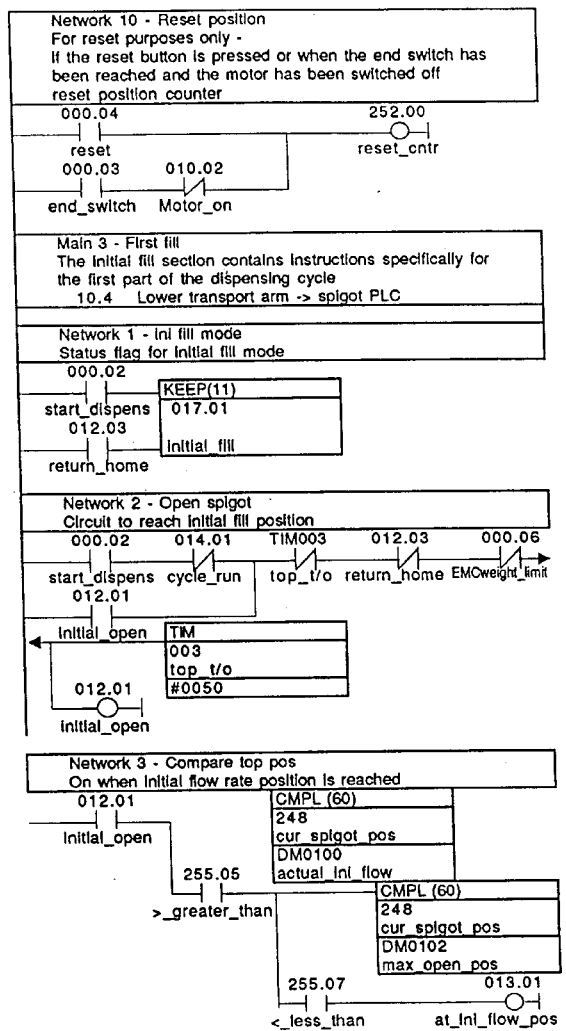

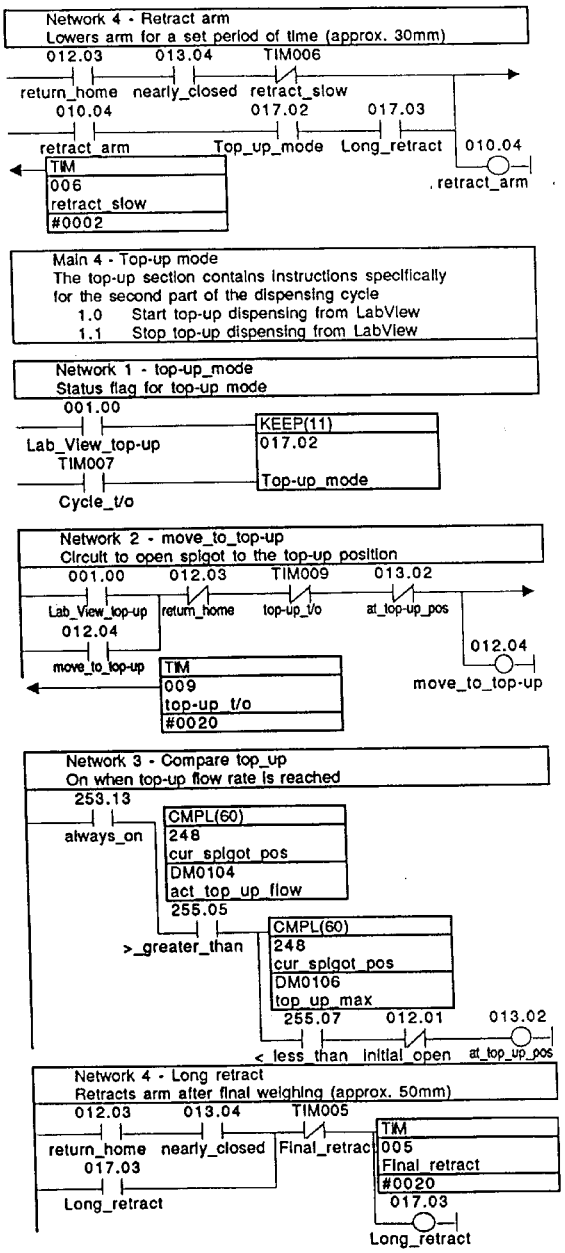

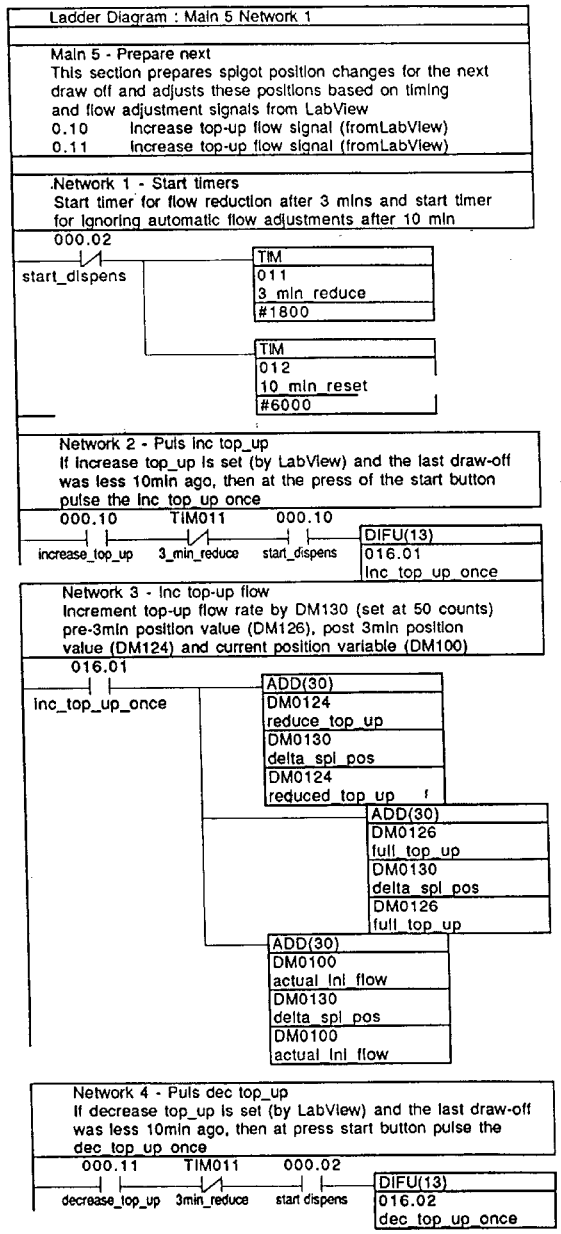

Data-Acquisition Program

The data acquisition and control program of present embodiments was written in Lab View version 4 to control the soft serve portion unit in tandem with the arm and spigot PLC's. Lab View is a real time programming software primarily utilised to perform complementary functions to PLC's which were not equipped for analogue signals i.e. weight. Lab View's main functions include monitoring of the analogue weight signal and providing start and stop pulses for PLC functions based on time measurements. However, any suitable programming software may be developed or adapted for use with this invention.

In general, a Lab View program is divided into two parts, front panel and back panel. The front panel is basically a graphical user interface where the use can control and interact with the program i.e. set parameters and view results. The actual program code resides in the back panel. Program instructions are represented as icons and connected in various program structures to form programs called virtual instruments (vi). Program functions interact with items on the front panel and interfaces with hardware components via an I/O data acquisition interface.

Front Panel

The user display is divided into 4 sections as described below.

1. Selection

User selection of desired soft serve portions. Three nominal weight settings provided, 80, 100 and 120 grams.

2. Settings

The spigot positions for the initial fill, within and after three minutes of the last draw, are recorded and the weight level setting from the EMC controller.

3. Results

Specific data displayed and updated during operation. These are key data required for control of the top up mode.

Elapsed time 1: Time taken for the initial fill

Intermediate weight: Actual weight of the initial fill

Elapsed time 2: Time required to fill the remainder of the soft serve

Final weight: Actual weight after the second fill

Status screen: Shows program mode of operation

4. File

Selected data is automatically appended to a file for further analysis at the end of each soft serve draw.

File name: set the name of the file and directory

Record: data set is saved automatically when selected

Back Panel

As an overview, the main program executes program instructions sequentially while interacting and exchanging information with four main functional components. The program starts by initialising and configuring the I/O device. Each component receives information directly either from the user interface or the I/O devices and counters as instructed by the main program.

Weight Monitoring

Weight is read in as an analogue signal. Voltage range is 0–10V corresponding to 0–200 grams.

Weight Formula

Determines the required top up dispensing period from the target weight (User parameters) and first fill static weight (weight) and dispensing period (spigot fully open).

Final Weight Assessment

An assessment of the final weight is carried out comparing it with the user selection. Result of the assessment is indicated by either an overweight (>3%) or underweight (<3%) signal.

Pulse Width Monitor

This function monitors the spigot fully open signal and was implemented by using one of two hardware counters available on the interface card. By using a counter, timing functions can be executed in the order of milliseconds. Two signals top up on and top up off are generated for the top up dispensing cycle.

Figure 3:
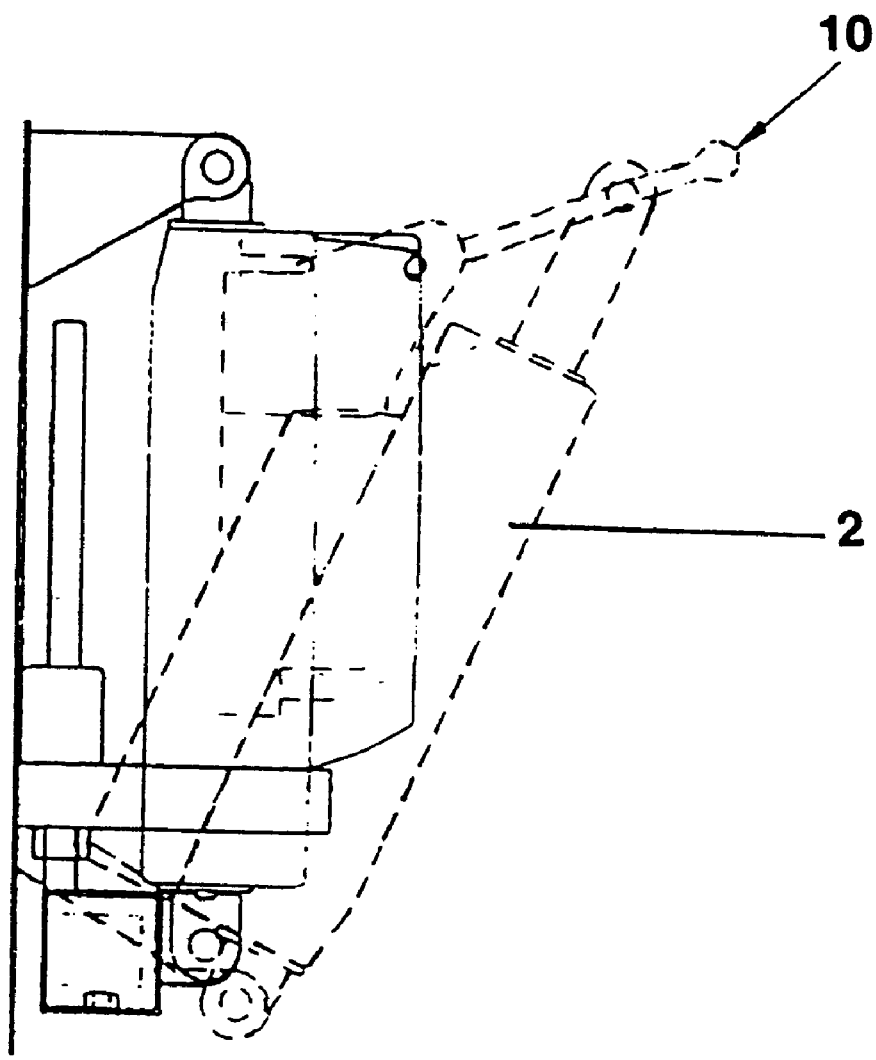
FIG. 3 is a diagrammatic cross-sectional view of the controlling valve or spigot responsible for the flow of the product.

A typical cycle time of signals for the spigot operation is shown in FIG. 3. Activating signals' start spigot, top up on and top up off are pulses of fixed 0.5 second duration. Move delay is the time taken for the spigot to reach top position and is consistently 0.4 seconds. The weighing delay is a fixed delay of 2.5 seconds to allow arm movement and stabilisation of weight reading. Both elapsed time 1 and elapsed time 2 are variables but the latter is derived proportionately from the former.

Portioning Algorithm for the Continuous Pour Embodiment

In summary, this embodiment employs a single portion dispensing method based on the same combined weight-time controlled concept as for the multiple pour embodiment. However, the dispensing method relies on the continuous assessment of the weight of the portion and time of delivery. Delivery of the portion is ceased when the portion falls within the preferred target weight range.

The dynamic weight monitored during dispensing is a combination of the actual gravity force and dispensing related forces on a load cell (8).

For example, once the cone transporter arm (6) reaches the position for dispensing, the spigot (9) opens to a preset position, and ice cream starts to flow into the cone (4).

When the required portion has been delivered, the spigot (9) closes and the cone (4) is raised so that the ice cream "plug" in the plunger area is essentially detached from the spigot (9) and forced onto the top of the portion to improve the shape of the delivered portion in the cone (9).

The additional step required in the multiple pour embodiment when the ice cream is delivered into a cone (the stopping of the dispensing and movement away from the dispensing nozzle to eliminate errors in the intermediate weighing step) can be eliminated by a variation to the closed-loop section of the process. For example, integration of a component of the draw-away cycle into both the spigot control and weighing operations enables all three functions to be performed continuously and repeatedly throughout the dispensing cycle. Accordingly, the two (or more) discrete step operations can be performed as one smooth step.

When a cup is the vessel used, the initial half of the portion falls an appreciable distance into the cup. Accordingly, the pressure effect is significantly reduced and this enables a time-based second-half cycle to be used to deliver a similar quantity of product (by weight) as the timed first half.

Another difference between the multiple pour and single pour embodiments occurs in relation to the portioning algorithm for the initial fill cycle. When the cone is the vessel being filled, the Cone Loading position of the cone transport now coincides with the starting position for the dispense cycle, thus the initial raise segment of the cycle has been relocated to the end of the cycle. The pre-set position used by the initial spigot positioning now has an adaptive range similarly updated between dispense cycles to the original top-up flow rate self-adaptive feature, which improves control of the rate of delivery.

Further, due to the pressure compensation technique employed, the initial trigger weight can be therefore lowered from 150% of the target weight, to a fixed value of 10 g. During delivery (as opposed to when the flow has been stopped), the cone is continuously re-positioned to a point determined by the analysis of previous pours. The trigger weights are progressively migrated to 10 g to 60, 65, 70, 75, 80 and finally 85 g (these latter values applying to a specific target weight only), the last weight being 100% of the target weight in use.

The flow rate is fine tuned across these thresholds giving a dynamic compromise between flow rate and accuracy for each of the phases with the cycle, starting with highest flow/least accuracy and completing with lowest flow/highest accuracy, thus giving an improvement over the two-stage (multiple pour) flow control method.

As with the multiple pour method, the cycle concludes with closure of the spigot valve, capture of a dispense timer ($t_1$), retraction of the cone and weighing of the isolated product.

Where a cup is the vessel used, the Cup Load position and initial flow control methods are as per the cone method discussed above. The cup algorithm may or may not include a pressure compensation method like that discussed above. However, an additional initial trigger point (as well as the conventional intermediate weight used in the multiple pour embodiment) may be included. The conventional intermediate weight in the single pour embodiment is preferably 50% of the desired target. Accordingly, the timing ($t_1$) of the cycle is preferably restricted between the 10 g and 50% weight trigger points.

The second-half cycle is time based using the results of the initial half cycle. Intermediate weighing is preferably real-time, thus no intermediate movement is required, and the transition between the first and second half of the cycle is imperceptible.

When the time portion of the cycle is complete, the normal closure/retractor final weighting occurs. The cup may or may not moved during the delivery portion of the cycle.

The differences between the multiple pour and single pour embodiments in terms of the discrete top-up cycle for the cone is the continuous integration of this stage into the single cycle pour.

Where the cup is the vessel, the discrete top-up cycle is seamlessly appended to the initial half-cycle of the pour.

Flow rate adaption is preferably therefore enhanced to affect all instances of delivery, and additionally in respect of the cone, is regulated throughout the pour as well. The adaption response time is preferably greatly improved by upgrading the linear modification factor to a combination of linear and exponential formulas. The tolerance band in which no adjustment is made can therefore be reduced.

Virtually all (where appropriate) phases of the various dispense cycles run an additional supervisory timer. If the successive way-point is not reached within a range of pre-determined time intervals from the previous way-point, the delivery cycle is terminated. Under these circumstances, the pressure compensation algorithm is not updated, although the initial flow control parameters are in an attempt to improve flow performance on the next cycle.

For both embodiments (the multiple and single pour) the preferred portion size is achieved within a preferred range by continuous monitoring (by the system) of the weight of the delivered product and the time taken for the delivery.

Not only is there continuous assessment throughout a single delivery cycle, but adjustment to an individual delivery cycle occurs on the basis of data recorded in previous deliveries.

Frequent deliveries within short time intervals, long term changes of the product during the day, and various operational changes of the machine can ultimately affect the delivery and require the delivery system to self correct or adapt to ensure subsequent deliveries are within the preferred target value range.

Accordingly, the dispensing system is capable of self-adjustment to ensure subsequent deliveries fall within the preferred target value range. The self-adapting algorithm of the system adjusts the flow rate for changed situations as well as corrections to achieve a portion within the preferred target range. The self-correcting feature of the portion control algorithm enables variation in flow rates to be compensated for by appropriate adjustments, right down to zero. The self-correcting feature will also operate at the next filling by correcting the final portion weight closer to the target.

Flow rate adjustment includes a compromise between the speed of adaptation of the machine to deliver a portion within the preferred target value range, and the accuracy of the fine adjustments.

The method of self-adaption enables the system to respond swiftly to changes caused by product and demand variation, to produce portions required in subsequent deliveries.

Dispensing Cycle for the Single Pour Embodiment

The dispensing cycle is started by a push button to initiate the computer program to start the Programmable Logic Controller cycle. The transporter arm (6) moves to the dispensing position triggered by an inductive sensor. Once the position is reached the spigot cycle is started.

The spigot actuator (2) effects operation of the spigot (9) and moves it to the fill position via lever (10). This position is monitored. The computer program is initiated to start the dispensing cycle.

The weight of a portion is monitored by an electronic weighing system controller (EMC) and a signal to close the spigot (9) is given to the programmable logic controllers (PLC's) after the portion has reached the weight limit for the selected target weight.

The spigot (9) closes and the computer program records the timing.

The product is then moved to the position for removal. Throughout the delivery, the computer program monitors the timing, and delivery of the product through the spigot (9). Commands are given to open and close the spigot (9) as required to complete the dispensing cycle.

If the final weight differs by more than a preferred amount from the target weight the computer program issues an "adjusted flow rate" signal to the programmable logic controllers (PLC) to ensure the following dispensing cycle is corrected for underweight or overweight delivery.

In preferred embodiments, the target value range of delivered product is between 3–5 grams plus or minus one gram, whilst the time of delivery in trials averages 11.5 seconds. Improvements to the system are aimed at reducing the delivery time, and improving the accuracy of the delivered portion.

In addition, requirements by outlets operating machines incorporating the control delivery system may include additional modifications enabling the portion to take a preferred shape throughout and at the end of the delivery of the portion.

The invention aims at an overall compromise between the accuracy of the pour weight and the speed of delivery. As the speed of delivery is determined by the consistency (or viscosity) of the mixture, it is an important feature of the system that it be capable of compensating for such viscosity variations (as well as variations in the product due to other factors).

Aspects of the present invention have been described by way of example only and it should be appreciated that modifications and additions may be made thereto without departing from the scope thereof as defined in the appended claims.

What we claim is:

1. A method for effecting the delivery of a predetermined target amount of a flowable substance, said method including steps of:

i) initiating delivery of said substance;

ii) part way during the delivery of said substance, a) determining a delivered weight of the substance delivered thus far and b) measuring a delivery time for delivery of said delivered weight;

iii) determining a remaining weight of substance required to complete delivery of the substance to achieve the predetermined target amount;

iv) calculating a top up time required for completing delivery of the substance to meet the predetermined target amount based on the remaining weight of substance required to meet the predetermined target amount and the delivery time;

v) further delivery of said substance for said top-up time so that said predetermined target amount is delivered, and vi) where optionally steps (ii) through (v) are repeated as a series of two or more successive reiterations until the predetermined target amount is delivered;

and the method characterized by at least steps (ii) through (v) being performed as a multi-pour delivery of the flowable substance with each step being variable in duration as required to effect preferred delivery of preferred quantity of the flowable substance, and in which delivery is based on dynamically acquired weight determinations requiring consideration of the effect of a force of delivery of the flowable substance, said consideration comprising increasing the target amount in the calculations to compensate for said force of delivery.

2. The method of claim 1 in which at least steps (ii) through (v) being performed without interruption of the delivery of said substance.

3. The method of claim 1 or claim 2 in which the targeted amount represents a minimum value to be delivered, or a range within which the delivered amount must fall.

4. The method of claim 3, in which consideration is given in the calculations to flowable substance bridging a delivery spigot for said substance and a receptacle into which it is delivered.

5. The method of claim 1 or claim 2 when step (vi) is performed, wherein during reiterations of step (iv) calculations based on weight and time determinations include a consideration of either or both of:

a) time and weight delivered since delivery was initiated, and b) time and weight delivered since a previous determination.

6. The method of claim 1 or claim 2 when step (vi) is performed, wherein during reiterations of step (iv) calculations based on weight and time determinations include a consideration of either or both of:

a) the total time and weight delivered since delivery was initiated, and b) the time and weight delivered since a previous determination.

7. The method of claim 1 in which the target amount is increased by either a percentage ratio of the target amount, or a fixed weight increment irrespective of actual target amount.

8. Apparatus for the delivery of a flowable material, the delivery of said material being controlled by a method according to either of claim 1 or claim 2.

9. Apparatus as claimed in claim 8 in which said flowable material comprises any one of: soft serve ice-creams, soft serve frozen confections, drinks, soups and toppings.

10. Automated dispensing apparatus for flowable comestible substances selected from beverages and frozen confections, including a portion control apparatus comprising:

a spigot issuing said substance to a suitable receptacle the receptacle comprising a cup or cone and maintained in position by a receptacle holder which after delivery of a target amount of said substance allows removal of said receptacle;

a timer a weight measurement apparatus for determining the weight of the receptacle and its contents, the automated dispensing apparatus including a controller having connections to said timer and said weight measurement apparatus to obtain data therefrom, and to perform calculations involving said data based on a stored sequence of procedures, and including an outgoing communication means allowing control of the spigot issuing the delivered substance the automated dispensing apparatus delivering a predetermined target amount of said substance, by i) initiating delivery of said substance through said spigot;

ii) part way during the delivery of said substance, determining a delivered weight of the substance delivered thus far; and measuring a delivery time for delivery of said delivered weight;

iii) determining a remaining weight of substance required to meet the predetermined target amount;

iv) calculating a top-up time based on said determined weight for completing delivery of the predetermined target amount based on the remaining weight and the delivery time;

v) further delivery of said substance based on top-up time calculations until said target is met.

11. The automated dispensing apparatus of claim 10, characterised in that an operation can be commenced by activation by a user, and wherein receptacle placement and its filling with a targeted amount of material is completed without further user intervention.

12. The automated dispensing apparatus of claim 11 in the form of a vending machine.

13. The automated dispensing apparatus of claim 10 in which said controller includes stored diagnostic procedures for evaluating and diagnosing at least one of:

a) failure of the portion control apparatus to respond or operate in accordance with communicated instructions of the controlling means, and b) deviation of current operation from stored or processed data from previous operation.

* * * * *